United States Patent
Clark et al.

(10) Patent No.: US 6,499,712 B1
(45) Date of Patent: Dec. 31, 2002

(54) ELECTRIC SEAT SLIDE AND ACTUATOR SYSTEM

(75) Inventors: Richard N. Clark, Farmington Hills; Philip E. Pryatash, Brighton, both of MI (US)

(73) Assignee: Tecla Company, Inc., Walled Lake, MI (US)

( * ) Notice: Subject to any disclaimer, the term of this patent is extended or adjusted under 35 U.S.C. 154(b) by 0 days.

(21) Appl. No.: 09/494,961

(22) Filed: Feb. 1, 2000

Related U.S. Application Data

(60) Provisional application No. 60/118,456, filed on Feb. 3, 1999.

(51) Int. Cl.$^7$ ................................................ F16M 13/00
(52) U.S. Cl. ........................................ 248/429; 248/424
(58) Field of Search .................................. 248/429, 424, 248/419, 421, 422; 297/346, 329, 344.17, 344.2, 341

(56) References Cited

U.S. PATENT DOCUMENTS

| | | | | |
|---|---|---|---|---|
| 5,048,786 A | * | 9/1991 | Tanaka et al. | 248/429 |
| 5,207,473 A | * | 5/1993 | Nawa et al. | 296/65.1 |
| 5,273,242 A | * | 12/1993 | Mouri et al. | 248/429 |
| 5,292,164 A | * | 3/1994 | Rees | 296/65.1 |
| 5,342,013 A | * | 8/1994 | Ito et al. | 248/429 |
| 5,765,798 A | * | 6/1998 | Isomura | 248/430 |
| 5,941,494 A | * | 8/1999 | Garrido | 248/429 |
| 6,021,990 A | * | 2/2000 | Freund | 248/429 |
| 6,138,974 A | * | 10/2000 | Okada | 248/429 |
| 6,220,642 B1 | * | 4/2001 | Ito | 296/65.14 |

* cited by examiner

Primary Examiner—Ramon O. Ramirez
Assistant Examiner—Gwendolyn Baxter
(74) Attorney, Agent, or Firm—Reising, Ethington, Barnes, Kisselle, Learman & McCulloch; William J. Waugaman

(57) ABSTRACT

An electro-mechanical dual linear drive system for adjustably power moving a watercraft seat along a linear travel path. A pair of elongate extruded hollow aluminum rails are mounted in parallelism to a fixed seat support structure. An elongate extruded aluminum hollow slide is non-rotatably and slidably mounted within each rail and driven in a linear travel path for moving the seat load. A lead screw is rotatably mounted within each slide and rail and a traveling nut on each lead screw moves the associated slide. A gear reduction drive mounted on each rail is driving coupled for rotating the associated lead screw. A single electric motor is rotationally drivingly coupled to both gear drive units for synchronously rotating the lead screws in response to motor rotation. Each rail and slide are non-circular and complementary for restraining relative rotation therebetween. A laterally protruding flange along one side edge of the rail bottom wall provides an exteriorly accessible mounting flange on the rail. Likewise, each slide has a planar mounting platform protruding laterally in offset relation to the associated rail to provide seat load fastening access clearance. At least two glides are fixedly carried adjacent longitudinally opposite ends of each slide and each have a generally rectangular cross-sectional configuration generally complemental to that of the slide and rail and generally forming a slide bearing therebetween. Each glide is molded from low friction plastic and has a free-state configuration flex stressed when in assembly on the associated slide and providing peripherally spaced slide bearing zones. A dual rail single lead screw system second embodiment is also disclosed, along with a swivel seat mounting third embodiment.

78 Claims, 12 Drawing Sheets

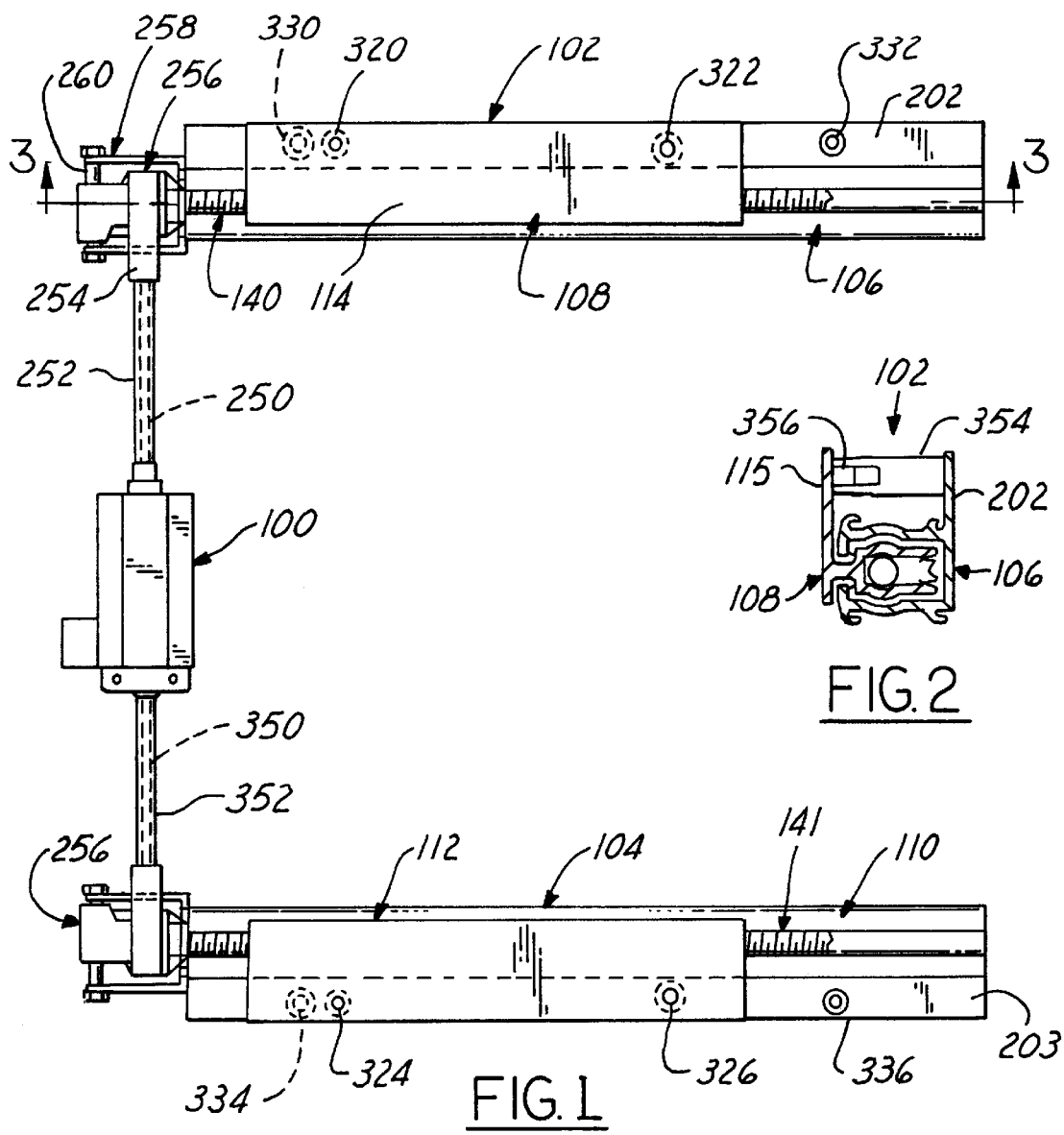
FIG. 1
FIG. 2
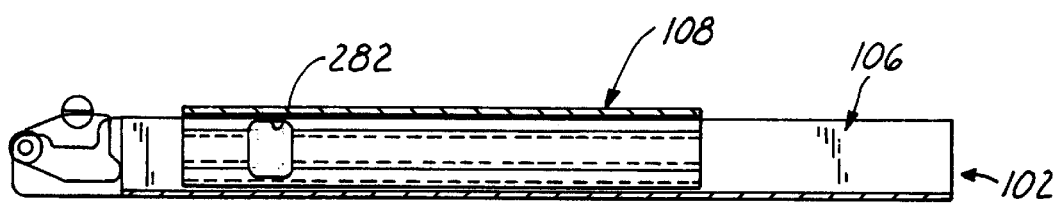
FIG. 3

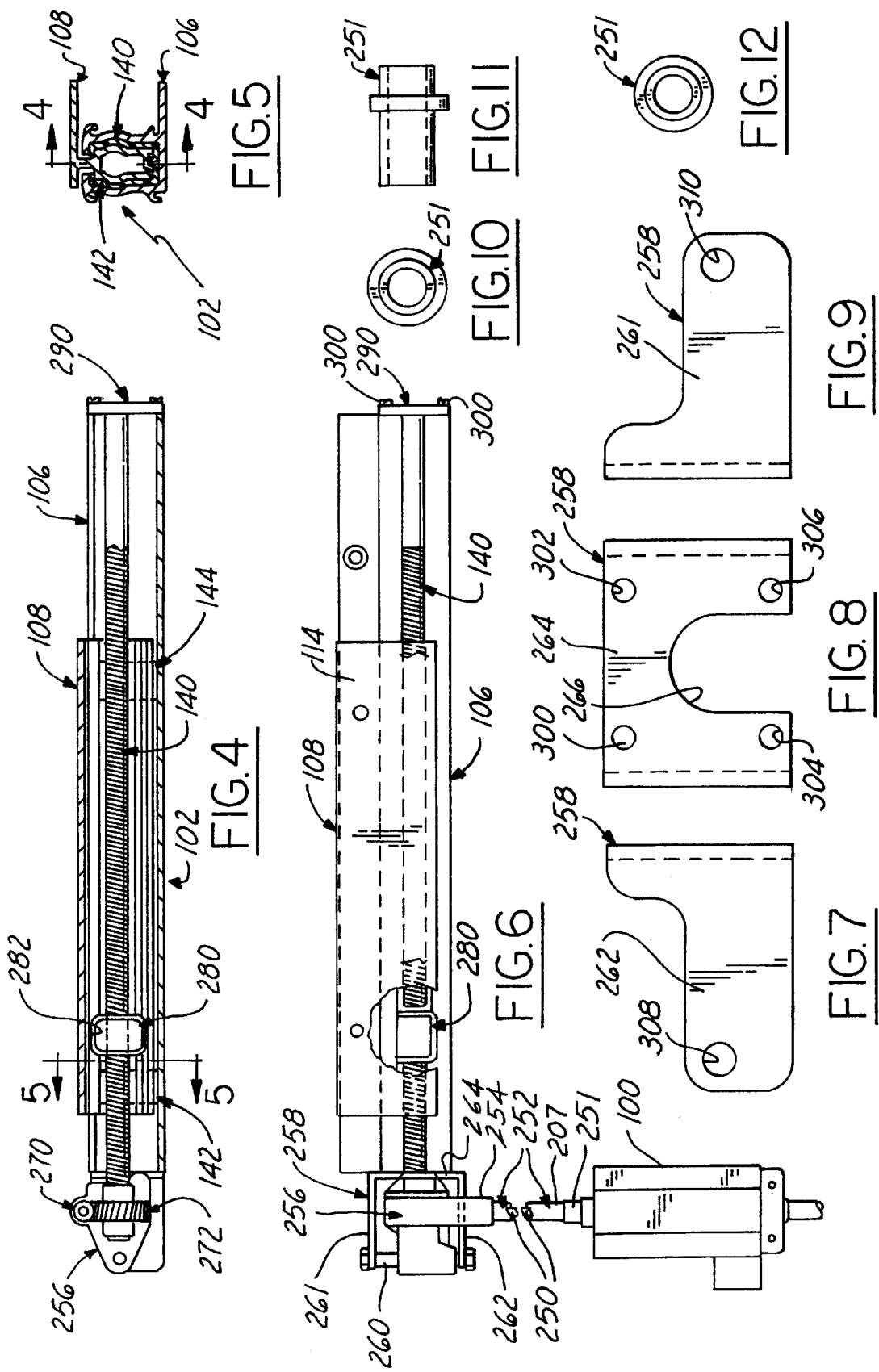

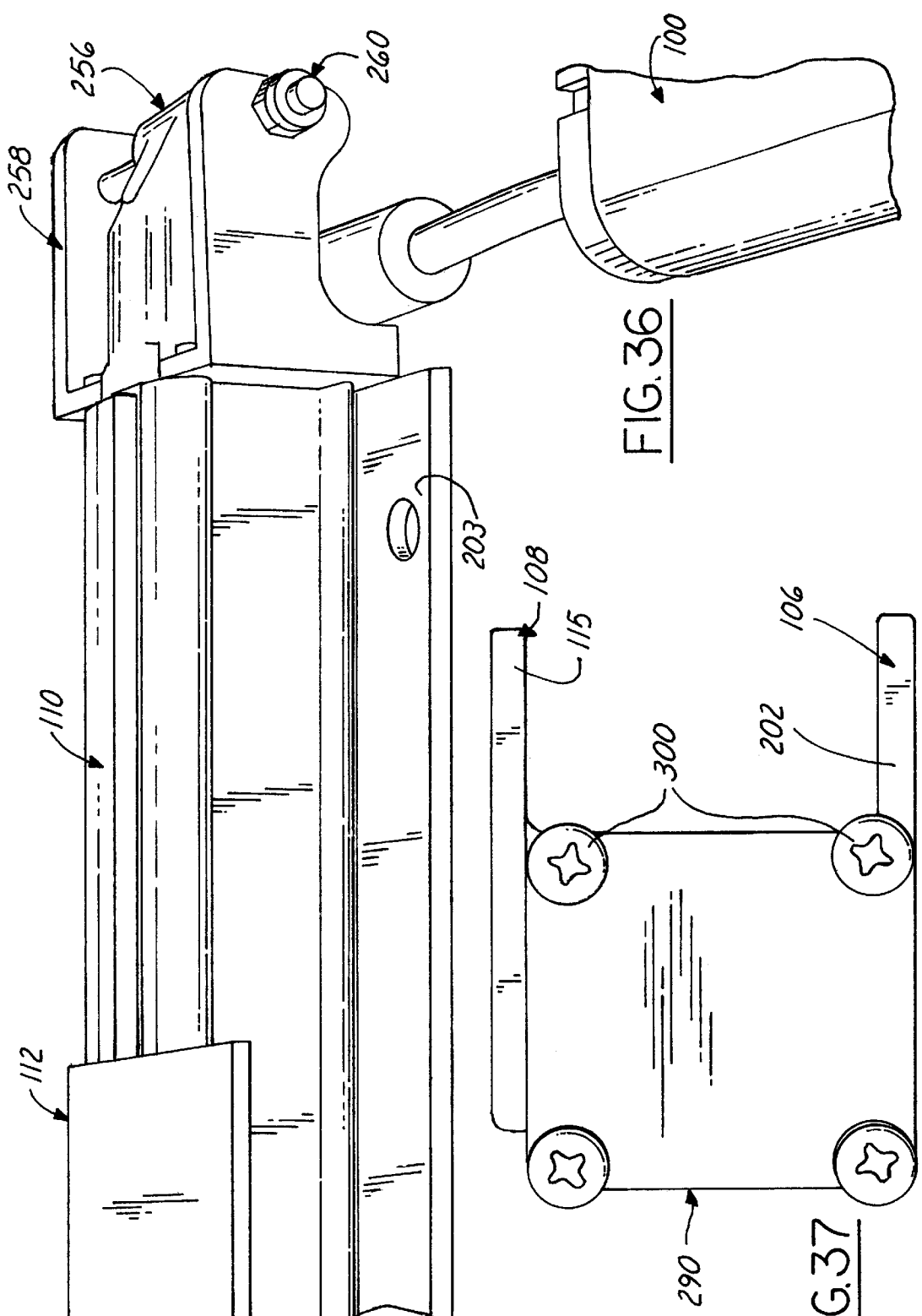

US 6,499,712 B1

ELECTRIC SEAT SLIDE AND ACTUATOR SYSTEM

This is a regular utility patent U.S. patent application filed pursuant to 37 U.S.C. §111 (a) and claiming the benefit under 35 U.S.C. §119 (e) (1) of United States Provisional Patent Application Serial. No. 60/118,456 filed Feb. 3, 1999 pursuant to 35 U.S.C. §11 (b).

FIELD OF THE INVENTION

This invention relates to electric motor lead screw driven linear actuators, and more particularly to such actuators for adjustable seat mechanisms particularly adapted for marine use on recreational watercraft such as cabin cruisers, speed boats, sport boats, fishing skiffs and the like.

BACKGROUND OF THE INVENTION

The continued development and upgrading of recreational watercraft has seen the introduction of various power driven convenience accessories including power actuated adjustable seats for helmsman, passenger and aft trolling/fishing station use. There also is a continuing need to improve such systems from the standpoint of such parameters as ease of installation on standard marine seating, vertical profile, load carrying capacity, non-binding operation, economy of manufacture, reliability, and service life under adverse marine environmental conditions.

Typically, the gear drive and associated heavy-duty slide and rail used for mounting the seats are provided as separate assemblies, which in turn leads to additional costs both in manufacture and in assembly and installation on the watercraft. In addition, in some prior art the load of the seat is impressed gravitationally on the gear drive and/or motor as well as on the associated dual slides and rails, thereby leading to track and/or carriage binding and even lock-up from stress-induced distortion, excessive wear, premature system failure and seat load limitations. Some systems now incorporate metal to metal contact in the carriage or slide assembly which leads to sticking and jamming from salt water corrosion and dirt. Other systems suffer from excessive play and rattling creating irritating noise when under way in the watercraft as they vibrate harmonically with the engine vibration imparted to the watercraft. Typically, the seat slide assemblies are installed as dual parallel tracking rails and carriage/slides wherein cocking is a problem, particularly when supporting extra-wide dual person side-by-side type seats, leading to drive jamming, motor failure and/or fuse blowing. Prior art assemblies also often require excessive vertical clearance between the seat bottom and the seat mounting area in order to fit the seat slide drive assembly, rendering the unsightly drive unduly visible and less stable in use.

OBJECTS OF THE INVENTION

Accordingly, among the objects of the invention are to provide an improved electric seat slide and actuator system that overcomes one or more of the foregoing problems of prior art marine electric seat slide and actuator systems and that is improved from the standpoint of (1) economy of manufacture, (2) versatility and flexibility in design, different travel lengths, thrust capacities and carriage travel speed, (3) overall height as installed, (4) ease of installation on standard marine seating, (5) unitization of gear drive and heavy duty slide and rail, (6) isolation of the weight load of the seat and the passengers sitting on the seats from the gear drive and/or motor for actuating the same, (7) reduction of frictional resistance to seat slide travel, (8) reduction or elimination of excessive play in the seat mounted on the actuator system, (9) dual seat carriage tracking capability along slightly misaligned parallel tracks, (10) ability to handle off-center loading without hang-up and jamming, (11) ease of installation as a complete assembly for mounting of the seat on the actuator system, (12) capability to resist lock-up or racking when a seat is moved against a travel resistance force applied unevenly or to one side only, or when weight-loaded unevenly and off-center as by an occupant sitting on either extreme end of the seat, (13) elimination of the need to cut holes in the mounting seat box on the watercraft in order to accommodate an excessively high system assembly profile, and/or (14) elimination of the need for a special mounting system.

BRIEF DESCRIPTION OF THE DRAWINGS

The foregoing as well as additional objects, features and advantages of the present invention will become apparent from the following detailed description, appended claims and accompanying drawings (which are to engineering scale except where indicated otherwise) illustrating improved apparatus provided and organized for a marine seating system application in accordance with preferred but exemplary embodiments of the invention constructed pursuant to the best mode presently known by the inventors of making and using the same, and wherein:

FIG. 1 is a simplified CAD line drawing illustrating in top plan view a first embodiment of an electric seat slide and actuator system of the invention, and shown as a complete assembly as manufactured and provided to the watercraft manufacturer for installation on suitable seat mounting structure and adapted to receive a seat mounted thereon.

FIG. 2 an end view projection of the port side rail and slide subassembly of FIG. 1, assuming for convenience that the assembly of FIG. 1 is watercraft mounted to provide fore and aft seat travel with the motor mounted aft.

FIG. 3 is a simplified sectional view taken on line 3—3 of FIG. 1, the drive lead screw and associated traveling nut being deleted form FIGS. 1–3 for simplification.

FIG. 4 is a simplified cross sectional view of the port side lead screw drive, track and slide subassembly taken generally on the line 4—4 of FIG. 5.

FIG. 5 is a cross sectional view taken generally on the line 5—5 of FIG. 4.

FIG. 6 is a fragmentary top plan view of the port side rail and slide subassembly with associated gear reduction unit and motor, with a portion broken away to illustrate details of the traveling nut of the subassembly.

FIGS. 7, 8, and 9 are respectively port side elevational, frontal elevational and starboard side elevational views of mounting bracket for the gear reduction unit of the subassembly of FIGS. 4 and 6.

FIGS. 10, 11 and 12 are respectively cable-end view, side elevation view and gear-reduction-end view of the motor drive cable lead-in ferrule provided for reinforcing the flexible drive coupling to the associated gear reduction drive unit and to the motor armature shaft.

FIG. 36 is a fragmentary perspective view of the aft end of the starboard slide and rail subassembly and a portion of the drive motor and drive cable connection thereto of the system assembly show in FIG. 30, as reproduced from a photo print of the actual prototype parts thereof.

FIG. 37 is an elevational view of the forward end, looking aft, of the starboard rail and side subassembly of FIG. 30 showing the end cap fastened to the rail in elevation.

DETAILED DESCRIPTION OF PREFERRED EMBODIMENTS

Figure 13:
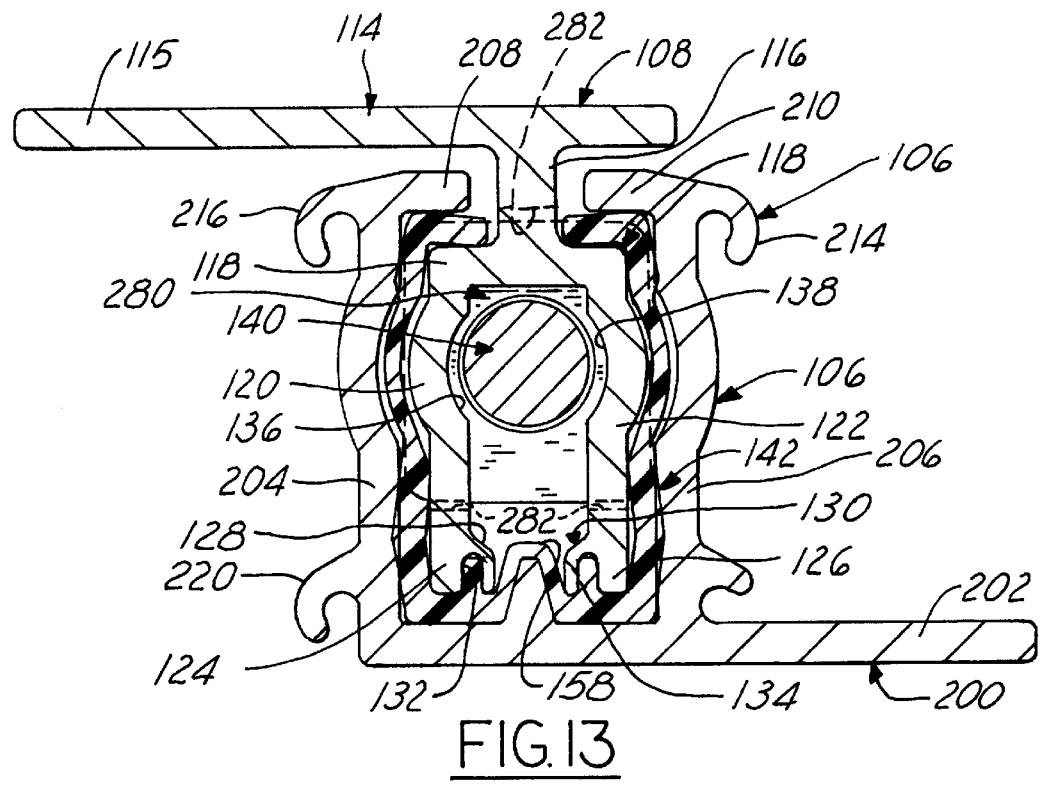
FIG. 13 is a cross sectional view of the port rail and slide subassembly, but with the slide reversely mounted relative to its mounting in FIGS. 1–6, taken in a cross sectional plane perpendicular to the rotational axis of the lead screw (and to the longitudinal axes of the rail and slide), and illustrating a slide glide in cross section in an imaginary view thereof as it would appear if not assembly stressed to conform to the clearance space between the slide and rail that is normally occupied by the glide in assembly, i.e., illustrating glide in its free state cross sectional configuration.

Referring more particularly to the accompanying drawings, FIGS. 1–20 are CAD drawings to engineering scale of an exemplary first embodiment system and apparatus of the invention. FIG. 1 illustrates in plan view the system set-up for a single motor/dual tandem drive for a dual rail/slide seat actuator assembly. Assuming that the desired seat travel is fore and aft and that a single drive motor 100 is to be mounted at the aft end of the assembly, a first rail and slide subassembly 102 will be herein designated the "portside" subassembly, and a second rail and slide subassembly 104 will be herein designated the "starboard side" subassembly. The two principal components of subassembly 102 is a "rail" 106 and a "slide" 108 mounted for sliding motion longitudinally along the rail. Subassembly 104 likewise has a rail 110 and a slide 112 identical to rail 106 and slide 108 respectively. It will also be understood that components 106 and 110 function a fixed guide tracks and are herein each termed a "rail", whereas components 108 and 112 function as load bearing carriages slidingly mounted in the rails for motion longitudinally therealong, and are herein each termed a "slide".

Figure 17:
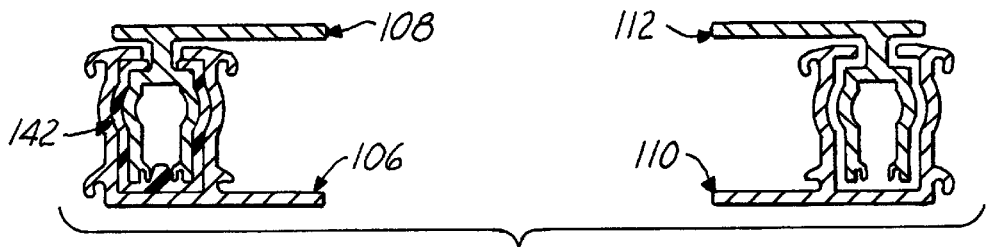
FIGS. 17, 18 and 19 simplified end views of the port and starboard slide and rail subassemblies respectively illustrating both the slide and rail mounting flanges oriented inwardly of the assembly (FIG. 17), both slide and rail mounting flanges oriented outwardly of the assembly (FIG. 18), and the slide mounting flange oriented inwardly of the assembly whereas the rail mounting flange oriented outwardly of the assembly (FIG. 19).

In accordance with one feature of the invention, rails 106 and 110 may be cut from the same extruded length of structural aluminum alloy stock having the as-extruded cross sectional configuration seen in FIGS. 2, 5, 13 and 17–19, and as best seen in FIG. 13. For further clarification at this point, it is to be understood that the rail and slide components in FIG. 13 are oriented as set forth in FIG. 19, whereas in the system assembly of FIGS. 1–6 the rail and slide components are assembled and oriented relative to one another as shown in FIG. 17.

Rails 106 and 110 are thus identical to one another and assembled as mirror image components for economy of manufacture. Likewise, slides 108 and 112 are cut from the same extrusion and machined for fastener openings in an identical manner so that they can be made as identical components and mounted in mirror image fashion in the assembly of FIG. 1 to economize on manufacture.

Each slide 108, 112 has a mounting platform portion 114 of rectangular configuration in plan view (FIGS. 1 and 6) integrally joined to the upper edge of a laterally off-center web 116 (FIG. 13) extending perpendicularly to the major plane of platform 114 and integrally joined a E its opposite, lower edge to a shoulder wall 118 of slide 108. A pair of laterally spaced parallel side walls 120 and 122 are integrally joined at their upper edges to shoulder wall 118 and depend therefrom to free lower edges 124 and 126. Each of these lower edges 124, 126 is provided with an inwardly offset toe portion 128 and 130 respectively and each of which is hollowed out by a longitudinally extending downwardly-opening groove 132 and 134 respectively. The upper region of each of the dependent side walls 120 and 122 of slide 108 has an outwardly bowed curved section of constant radius of curvature, thereby defining laterally opposite concave interior surfaces 136 and 138 dimensioned for loosely cradling therebetween a drive lead screw 140 of subassembly 102 (FIGS. 4, 5, 6 and 13).

Each slide 108, 112 is preferably provided with a pair of identical slide bearings, herein termed "glides" 142 and 144, of identical construction and located one adjacent each of the opposite longitudinal ends of each slide as illustrated in FIG. 4, Glides 142, 144 are preferably injection molded but alternatively may be sections cut from a single extrusion of lubricant-filled plastic material, such as that sold under the trademark ACETRON by DSM Company, which is a filled Delrin plastic material. Other compositions of polyolefin and polyethylene or polypropylene filled with self-lubricating material to provide good lubricating properties are also usable as materials for glides 142, 144. In any event the plastic material selected should have a high elastic modulus or spring rate for developing suitable spring frictional retention grip when stressed to develop a pre-load in assembly of the glide on the slide.

Figure 14:
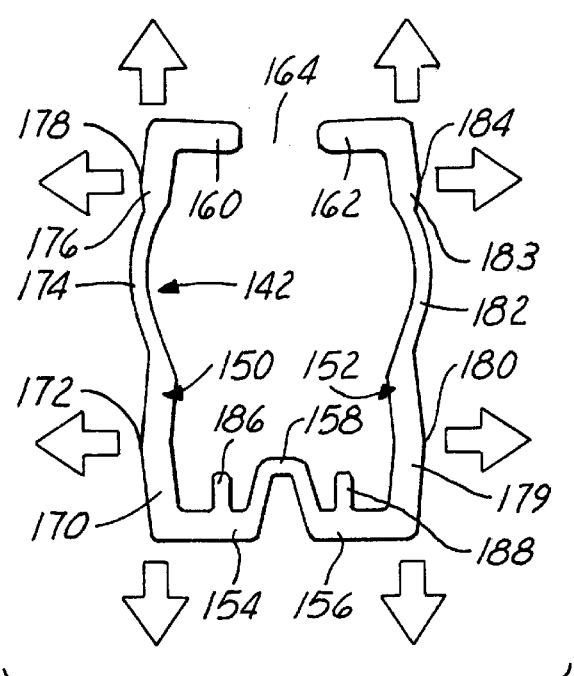
FIG. 14 is an end view of the glide shown by itself in its unstressed or free state condition, i.e., as originally de-molded and unstressed, and illustrating schematically with force arrows those zones of the glide that resiliently press against the adjacent surface area of the rail as the glide is preloaded in assembly on the slide and the slide/guide subassembly slidably inserted into the rail.
Figure 15:
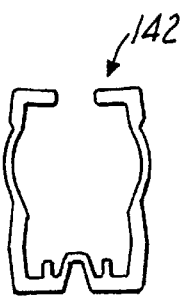
FIG. 15 is another end view of the glide shown by itself in free state condition.
Figure 16:
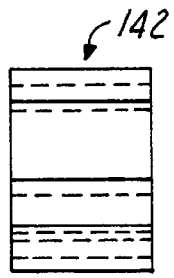
FIG. 16 is a side elevational view of the glide of FIG. 15.

More particularly, and referring to FIGS. 15 and 16, glide 142 is shown in end view and in side view in its free state, and in an as-molded or as-extruded and cut condition. FIG. 14 is an enlargement of FIG. 15 also showing glide 142 in its free state or unstressed condition. It will be noted that the cross sectional contour of glide 142 generally conforms to the configuration of the design clearance space provided between rail 106 and slide 108 in their operative assembled relationship (see FIGS. 17–19). Thus glide 142 has a pair of laterally space d side walls 150 and 152 integrally interconnected by a bottom wall made up of coplanar wall portions 154 and 156 respectively integrally joined to the bottom edges of side walls 150 and 152 and extending toward one another. ("Integral" as used herein means joined or united into one piece as and when molded or extruded). Bottom wall portions 154 and 156 are interconnected by a raised rib portion 158 that functions as a folded spring to compensate for dimensional variations in glide 142 and/or in the aluminum extrusions from which rail 106 and/or slide 108 are cut. A pair of top leg walls 160 and 162 extend toward one another and are integrally joined one to each upper edge of side walls 150 and 152 respectively. The free ends of leg walls are spaced apart to define a gap 164 therebetween to accommodate web 116 of slide 108 in assembly therewith.

It is to be noted that, in their free state as-molded condition, leg walls 160 and 162 incline downwardly from one another at a slight angle rather than being coplanar. The interior dimension and resilience of glide 142 is designed to enable a flexing slide-on snug fit of the glide 142 endwise onto slide 108 as shown in FIGS. 13 and 17. The top leg walls 160 and 162 during this fit-on have a slight interference fit with the top surfaces of shoulder wall 118 of the slide. Therefore leg walls 160 and 162 must bend upwardly to assume a coplanar orientation as seen in FIG. 17. This stress places the resilient plastic material of the glide under preload and thus helps the frictional grip retention of glide 142 on side walls 120 and 122 and shoulder wall 118 of slide 108.

The free state as-extruded cross-sectional configuration of glide 142 is also purposely made slightly non-conforming to the cross-sectional configuration of the internally uniform clearance space between the exterior surfaces of slide walls 118, 120 and 122 and the juxtaposed interior surfaces of rail 106. Thus, as best seen in FIG. 14, side wall 150 is provided with a s hallow angle outwardly crowned (with straight wall sections) portion 170 having an apex at 172, a bowed outwardly convexly curved portion 174 and an upper very slightly crowned (with straight wall sections), portion 176 having an apex at 178 and integrally joined at its upper edge to the outer edge of leg wall 160. The opposite side wall 152 of glide 142 is contoured in identical fashion but in mirror image and thus has a lower crowned portion 179 with a crown apex 180 corresponding to apex 172, an outwardly convex bowed portion 182 opposite portion 174, and a slightly crowned upper portion 183 with an apex at 184 and integrally joined to leg wall 162 at its upper edge.

Glide bottom walls 154 and 156 also each respectively have upwardly protruding longitudinally extending mounting rib 186 and 188 that respectively fit snugly into the longitudinally extending slots 132 and 134 formed in the lower toe edges 124 and 126 of the slide walls 120 and 122, as best seen in FIG. 13.

It is to be further understood that in FIG. 13 glide 142 is shown (with artistic license) in imaginary assembly with slide 122 and rail 106, glide 142 being shown in its free state contour to better illustrate the nature of the overlapping interference relationship it has relative to the geometric cross sectional configuration of the clearance space defined between the slide as nested in the rail. In actuality, glide 142 is resiliently deformed upon assembly between these components to be pre-stressed and preloaded so as to essentially fill this slide-to-rail clearance space. Therefore in assembly glide 142 would appear more as shown in the left hand figure of FIG. 17. This bearing preload deformation feature will be better understood after explaining the construction in detail of rail 106.

Figure 18:
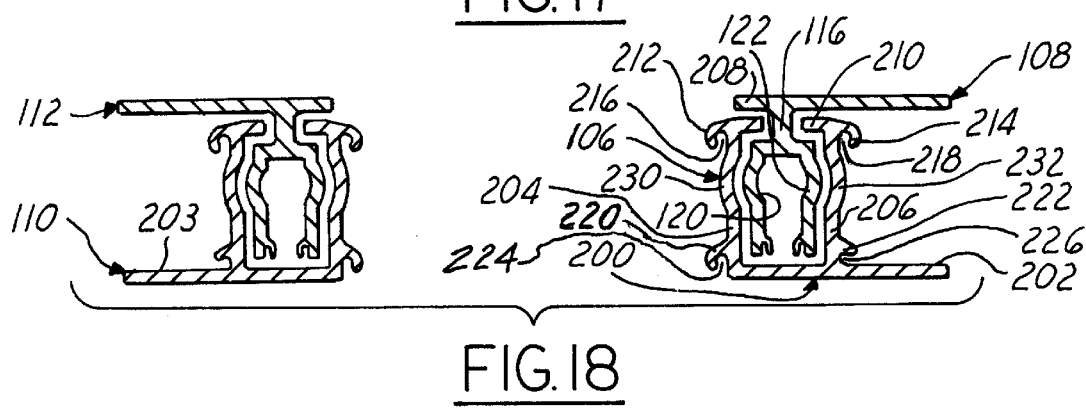
Figure 19:
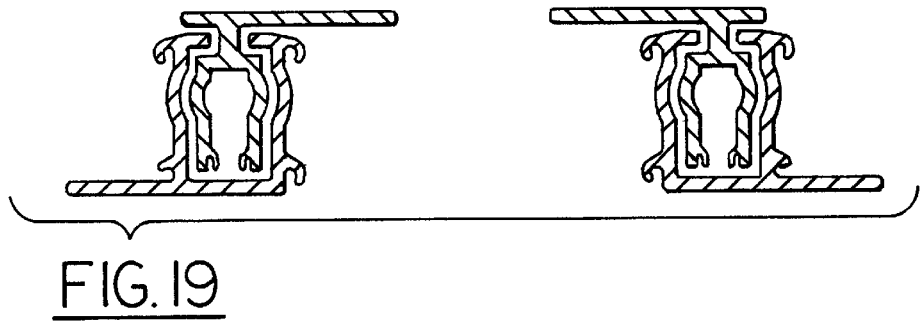

Rail 106 will be described in detail with reference to the right hand view of FIG. 18 to avoid crowding of reference numerals in FIG. 13. Rail 106 has a bottom wall 200 with an integral coplanar mounting flange extension 202. A pair of laterally spaced upright side walls 204 and 206 are integrally joined at their lower edges to bottom wall 200. Each side wall 204, 206 is respectively capped at its upper end by a leg wall 208, 210 and these are laterally spaced apart at their inner free edges to permit passage therebetween of web 116 of slide 108. The outboard, longitudinally extending edges of leg walls 208, 210 each have a re-entrantly curved lip 212, 214 respectively which present a smooth rounded outer, longitudinally extending edge to the upper longitudinal edges of rail 106. Lips 212, 214 also each define a curved channel 216, 218 respectively that opens at both longitudinally opposite ends of the rail. Rail side walls 204, 206 also each have downwardly and outwardly sloping ribs 220, 222 respectively protruding from their exterior surfaces at an elevation slightly above the upper surface of bottom wall 200. Rib 220 has a re-entrant curvature to define another open-ended channel 224. Rib 222 has a slight re-entrant curvature to define with the upper surface of extension 202 still another open-ended channel 226. (As noted in more detail hereinafter it will be seen that the centers of the four open-ended channels 216, 218, 224 and 226 are by design spaced at the four corners of a square, i.e., equidistant from one another on X and Y Cartesian coordinates.) Each side wall 204, 206 of rail 106 has an outwardly bowed portion 230, 232 respectively that matches the outwardly bowed curvature of the bowed portions 120 and 122 respectively of slide 108. It thus will be seen that the exterior cross sectional geometry of slide 108 in the portion of web 116 and walls 120 and 122 defines a uniform clearance space with the juxtaposes interior surfaces of rail walls 204 and 206, rail bottom wall 200 and the rail top leg walls 208 and 210.

Returning again to the slide-in-rail assembly procedure and the fit of glide 142 between the rail and slide described previously in conjunction with FIGS. 13–16, it will seen from FIG. 13 when compared to the showing in FIG. 17, left hand view, that the slide-assembled glide 142 as stress-slip-fitted on slide 108 is further squeezed and conformed to the exterior surfaces of the slide as the glide is inserted into the confines of the hollow interior of rail 106. The glide deforms resiliently to make this conformation fit. However, sticking and jamming of this guide slide bearing during its sliding engagement with the rail interior wall surfaces is prevented by the low coefficient of friction of the lubricant-filled plastic material of the glide. Frictionally drag is also reduced by the bowed portions 174 and 182 of glide 142, as best seen in FIG. 14, being made thinner in cross section so that there is a clearance remaining between these portions of the glide and the adjacent surfaces of the rails and slide after assembly of the three parts together.

The drive of slide 108 fore and aft along rail 106 is produced by corresponding bi-directional rotation of lead screw 140, which in turn is driven by a conventional commercially available reversible electric motor 100. The rotational output torque of motor 100 is transmitted by a conventional flexible cable drive shaft 250 encased in a flexible cable shroud 252 (FIG. 1) that is drivingly coupled into the input end 254 of a conventional right angle gear reduction drive unit 256. The output shaft of gear unit 256 is drivingly affixed as by welding to the adjacent end of lead screw 140. Gear reduction drive unit 256 is supported by a bracket 258 that carries a support bolt 260 that in turn extends through a mounting bore in the housing of the gear reduction drive unit 256.

The construction of bracket 258 is best seen in FIGS. 7, 8 and 9. The port and starboard side walls 261 and 262 of the bracket are cut away to provide clearance for the tubular input shaft protuberance 254 of the housing of drive unit 256. The end wall 264 of bracket 258 mounts in abutment against the end surfaces of rail 106 and is centrally slotted at 266 to provide assembly clearance for passage therethrough of the lead screw 140 and the forward end of the drive unit housing. As shown in FIG. 4, drive unit 256 contains an input worm gear drivingly engaged with a mating helical gear 272, preferably pitched for a 20 to 1 reduction drive ratio, thereby providing a high mechanical advantage for driving the slide as well as a self-locking gear drive mechanism to securely hold the associated slide against travel on the rail when rotation of motor 100 is stopped.

A lead screw drive nut 280 (FIGS. 4, 6 and 13) is threadably received on lead screw 140 and is loosely received in a complementally shaped opening 282 milled through the walls 120 and 122 of the slide and extending partially into web 116 of the slide. Nut 280 is generally rectangular shaped in cross section with its width dimension extending parallel to the side walls of the rail and its thickness dimension extending perpendicularly thereto. The opposite lateral sides of drive nut 280 have a loose sliding fit between the juxtaposed inner surfaces of the rail side walls 204 and 206. The outline of nut 280 can be seen in FIG. 1 where it will be understood that the rectangular configuration of the nut in cooperation with the flanking rail side walls 204 and 206 prevents rotation of the nut. Hence rotation of lead screw 140 will threadably advance or retract the nut along the lead screw. The protrusion of the nut front and rear faces in overlapping abutment with the slide opening faces formed by milling opening 282 in the slide side walls provides the driving engagement between the nut and the slide, as best seen in FIG. 4 and in the cut-away portion of FIG. 6.

As best seen in FIG. 13 lead screw 140 is generally journal supported loosely by the cradling of the concave surfaces 136 and 138 of slide side walls 120 and 122 in conjunction with the bearing support provided by nut 280 loosely riding on the edges of the nut opening 282 milled into the slide side walls. Because of this assembly clearance between the subassembly of lead screw 140 with its traveling drive nut 280 relative to slide 108, weight loads and any other loading on the slide and/or rail by forces acting in a plane perpendicular to the lead screw axis are not transmitted to the lead screw and nut subassembly. Hence the lead screw and nut as well as the gear reduction 256 and motor 100 are substantially isolated from seat loadings imposed vertically or in any direction in such plane perpendicular to the axis of the lead screw. Lock up and/or binding of the slide drive otherwise typically resulting from such adverse forces is thus prevented. The lead screw drive reaction forces exerted in tension and compression on lead screw 140 in response to operationally generating driving forces on the slide, or in exerting a holding braking force, are taken in the gear reduction housing by conventional thrust bearing structures provided in such conventional commercial units.

Figure 20:
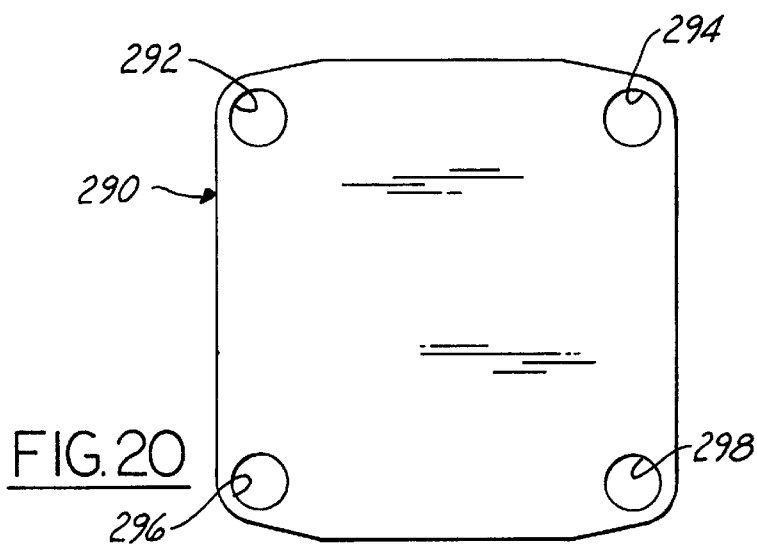
FIG. 20 is an end elevational view of one of the rail end cap plates shown by itself.
Figure 22:
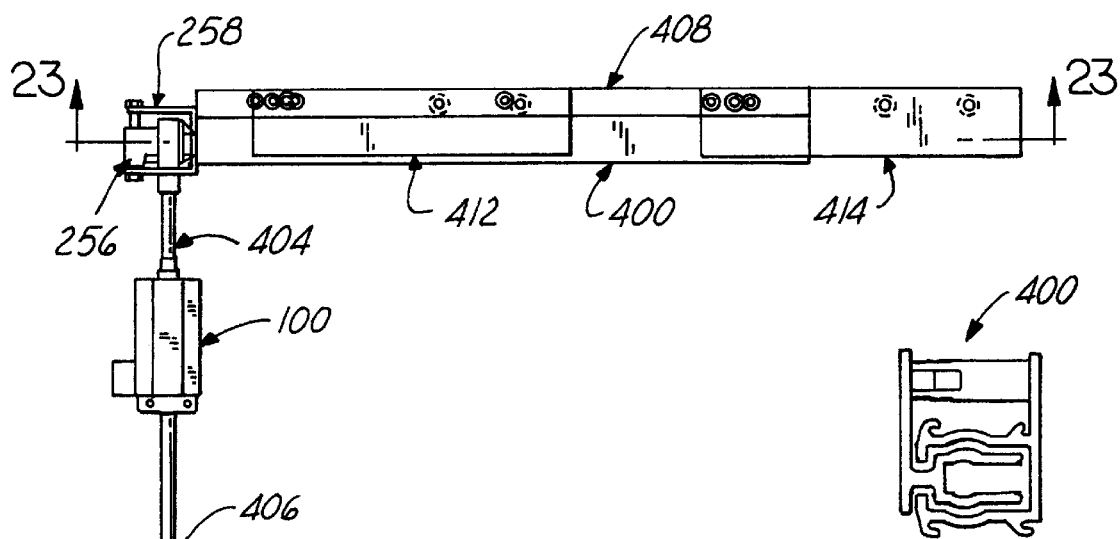
FIG. 22 is a simplified end elevational view projected off the port side slide and rail subassembly of the assembly of FIG. 21.

As a further feature to enhance system installation versatility, the forward ends of rails 106 and 110 are closed by an end cap plate 290 shown assembled on the rail in FIGS. 4 and 6, and shown by itself in FIG. 20. Four mounting holes 292, 294, 296 and 298 are provided, one in each of the four corners of end plate 290, for individually receiving therethrough self-tapping screws 300. Screws 300 individually self-thread into the aluminum material of the extrusion as they are received in the associated open ends of rail channels 216, 218, 224 and 226 Due to the previously-mentioned equidistant X-Y coordinate spacing of the open ends of these rail channels, and likewise as to the mounting openings 292–298 of the head plate 290, and plate 290 can be mounted in any one of four 90° rotated positions. Likewise, mounting bracket 258 is provided with four mounting openings 300, 302, 304 and 306 (FIG. 8) in the end wall 264 of the bracket that also are located on equidistant X-Y coordinate centers to line up with the four open ends of the rail channels 216, 218, 224 and 226 at the opposite longitudinal ends of the rail. Self-threading screws are again provided through these openings to mount bracket 258 to the rail end. Again, any one of four quarter turn installation positions may be utilized because of the mounting hole equidistant spacing. The holes 308 (FIG. 7) and 310 (FIG. 9) in side walls 262 and 261 of the bracket receive the drive unit mounting bolt 260 therethrough for mounting the drive unit in the bracket after the mounting screws have been inserted into the rail end.

From the foregoing description it will be seen that the electric seat slide and actuator system of the first embodiment of FIGS. 1–20 combines the components as a complete factory pre-assembly of the dual spaced-apart rails and slides, the dual lead screw drives, dual gear boxes and single electric motor. Typically, a boat seat is mounted on top of the assembly by fastening it to the two laterally spaced slides 108 and 112, utilizing preassembled machine screw fastening lugs 320, 322 on slide 108 and 324 and 326 on slide 112 (FIG. 1). These fastening lugs are provided in the offset extension mounting flange 115 of the mounting platform 114, and hence are spaced outwardly and clear of the rail upright wall structure regardless of the assembled orientation of the rail and slide, as will be evident by comparing the various orientations shown in FIGS. 17, 18 and 19. The seat, with the electric seat drive rails and motor assembly attached, can then be mounted on a seat box or other attachment structure in the watercraft by utilizing mounting fasteners 330 and 332 provided in the lateral mounting flange 202 of bottom wall 200 of rail 106 (FIG. 1), and fasteners 334 and 336 in the like lateral extension mounting flange 203 of rail 110.

The entire assembly and its various components are preferably designed for use in marine applications that require resistance to salt water. The exposed surfaces are therefore made of marine grade materials. However, it is to be understood that this assembly, drive and mounting slide can be used for other non-marine applications. However the slide and rail are preferably made of aluminum material as extrusions that best lend themselves to marine application. The extrusion cross sectional configuration of the rail incorporates integrally the lateral mounting flange extension or legs 202 and 203 of the respective rails, and likewise the extrusion cross sectional configuration of the slide incorporates integrally the lateral mounting flange extensions 115 of the mounting platforms 114 of the slides. In addition, the rail extrusion configuration provides for the four self-tapping screw openings in each of the opposite longitudinal ends of the rail.

Glides 142 and 144 for each slide can be made by extrusion but preferably are injection molded of filled Delrin material to provide bearing surfaces that are self-lubricating and thereby insure a good sliding action. The stiff but resilient nature of this glide material, as configured in the slides as described previously and when fit on the slide and inserted in the rail to be stressed in the clearance space therebetween, has been found to eliminate play between the slide and rail that otherwise would cause an undesirable wobble or rattle of the seat assembly.

The slide extrusion with the toes 128 and 130 providing the glide mounting slots 132 and 134 for receiving the ribs 186 and 188 of the glide enables each glide to be easily fastened securely in a selected position on the slide. This is done by striking in and thereby permanently deforming a portion of the toe wall adjacent to but just beyond the axially opposite end faces of the glide. Thus, slots 132 and 134 and the tabs thereby formed in slide wall toes 128 and 13) that are designed into the extrusion configuration enable this material to be easily crimped to form tabs in-situ that hold the two glides in place on the slide after the same has been stress slip-fitted and slid into desired location on the slide.

In the first embodiment system of FIGS. 1–20 motor 100 is remotely mounted from each rail and slide sub assembly, and a pair of flexible drive shafts couple each end of the motor output shaft to drive in tandem each of the dual lead screws via each associated gear box 258. A conventional automotive type electric motor 100 thus can be utilized that will allow connecting two conventional flexible drive shafts 250 and 350, one to each of the output ends of the motor, so that shaft 250 drives lead screw 140 and shaft 350 drives lead screw 141 (FIG. 1). Connecting both drive shafts 250 and 350 in tandem advantageously enables the drive of the port and starboard slide and rail assemblies 102 and 104 to be synchronized. Typically, the carriage or the slide of each of these port and starboard slide and rail subassemblies is mounted one on each side of the seat. Hence with this driving system the load is applied to both sides of the seat. With the slides so synchronized and driven in unison, there is very little or no tendency to lock up or rack the drive system, such as that which typically occurs in prior constructions when a seat is moved with a load that is applied unevenly or to one side only.

Preferably drive screws 140 and 141 and drive shafts 250 and 350 are made of high tensile steel, which, of course, is not a marine-grade material. However, drive shafts 250 and 350 are covered with a plastic sheath 252 and 352 to protect them from the marine environment. A special corrosion resistant coating is put on each of the drive screws 141 and 142, and a special marine-grade grease is used to coat the drive screw and drive shafts to insure that they can withstand salt water conditions.

Due to the spacing or clearance between the exterior surfaces of the slide and the interior surfaces of the rail, typically 0.100 inches, and which is maintained in operation by the slide bearing glides 142 and 144, compensation is thereby provided for any misalignment that might occur when deflection-magnitude loads are applied to the seat assembly, or rail misalignment is imparted by improper mounting surface structure. Glides 142, 144 also eliminate metal-to-metal contact or torque twist from the screw drive mechanism that drives the slides on the rails. The folded spring provided by the raised bow rib 158 in the bottom will portions 154 and 156 of glides 142, 144 fills the gap between the slide and rail, and this bow rib flexes if there is side-to-side misalignment therebetween. This bow rib thus acts as a spring to eliminate noise or rattle that would occur if there were a free gap between the slide and rail. This folded spring also compensates for dimensional vacations in the plastic or aluminum extrusions.

As best seen or visualized in the illustration of FIG. 13 and FIG. 14, each plastic glide 142, 144 has bearing points at each of its four corners to transmit loads applied between the rail and slide in any direction at a plane perpendicular to the screw axis. This is important inasmuch as such loads are applied in all directions, up, down or sideways. Seat testing has shown that the greatest loads are downward and upward, as occurs when the seat occupant rocks back and forth, or when the occupant leans back against the back of the seat. The slide bearing system provided by the pair of spaced glides 142 and 144 thus insures that all such loading can be taken adequately by this system without frictional lock up or damage to the system.

The lateral extension provided by the asymmetric cross-sectional geometry of the mounting platform 114 of the slide, i.e., its laterally offset mounting flange 115, and likewise the laterally offset mounting flange 202 of the bottom wall 200 of the rail, as described previously, provides convenient offset mounting flanges for mounting the assembly to the seat or seat box or to other mounting structure in the watercraft. These offset mounting flanges extend beyond the associated upright structure of the slide and rail and thus act both as beam stiffeners and readily accessible platforms for ease of inserting and removing mounting fasteners. The assembly thus accommodates the preference of boat builders who prefer an assembly that lets them flush mount to the flat surface of the seat and the flat surface of the seat box.

In the illustrated embodiment the slide and rail assembly with gear box accomplishes a low profile seat mounting and power drive system assembly which, for example, may be only 1¾ inches in vertical dimension.

Typically, motor 100 is operably electrically coupled in a conventional travel control system that utilizes the gear reduction bracket 250 at one end of the rail and the end bracket or plate 290 at the other end of the rail as limit stops against which the juxtaposed end of the slide abuts attach end limit of travel in the rail. This obstruction increases motor current load that, through a thermistor in the motor circuit, de-energizes the motor, thereby providing a typical limit switch motor control type operation for this system. If desired, an adjustable stop 354 can be fastened to the lateral extension 202 of rail 106 (FIG. 2) and a stop abutment 356 fastened to the lateral extension 115 of slide 108 to thereby serve as an adjustable stop system to suitably adjust travel of the actuator assembly.

Use of aluminum extrusions to manufacture the rail and slide components facilitates modular design and manufacturing. These extrusions can be cut to varying lengths to suit various applications. Thus, two basic extrusion cross sectional configurations and the associated simplified extrusion die and tooling can be used to create a large number of different assemblies, thereby reducing manufacturing costs. Further versatility is achieved because the pitch of the lead screw can be readily changed by appropriate selection of lead screws to give faster traverse, or slower traverse with greater torque. The lead screws can be standard automotive drive screws for power seats in vehicles, and thus such are readily commercially available in standard lengths. Custom lengths can be created economically by using cut down or using stub drive screws and welding different drive screws on to provide different lengths and pitches. Drive motor 100 is also readily and economically available from automotive suppliers and may be low profile, i.e., a vertical dimension of only 1¾ inches. The plastic glides 140 and 142 are preferably made of lubricant-filled Delrin or a polyolefin-polyethylene or polypropylene that have good lubricating properties. Whatever plastic material is used to meet this parameter should have a high elastic modulus or spring rate inasmuch as the high spring rate of the plastic material of each glide as intended to assist the glide functionally gripping and staying in place on the slide initially as a workpiece subassembly during manufacture, i.e., until the final tab staking operation is performed.

The electric seat slide and actuation system may be used in applications to move the watercraft seats fore and aft, or to move these seats up and down, or to tilt seats up and down. The system can also be used to move bolster seats up and down and in an arc. This system is also adaptable to be used as a lift mechanism for imparting motion either vertically or in an arc, such as a hinge-mounted pivoted hatch. For this purpose the mounting surface on the slide and rail can be modified to accept a clevis. The rail and slide subassembly substantially limits relative rotation between the slide and rail about their center line axis, which assists in maintaining good vertical and horizontal rail and slide alignment and parallelism in operation.

FIGS. 10, 11 and 12 illustrate an injection molded plastic ferrule 251 that is preferably utilized to receive the flexible drive cables 252 and 352 therein at their ends to limit bending stress on the cables at these terminations in accordance with conventional flexible drive cable practice.

Second Embodiment

Figure 21:
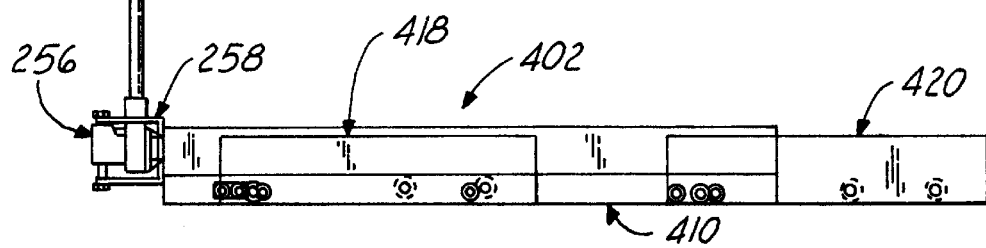
FIG. 21 is a simplified CAD drawing top plan view of a second embodiment electric seat slide and actuator system of the invention.
Figure 23:
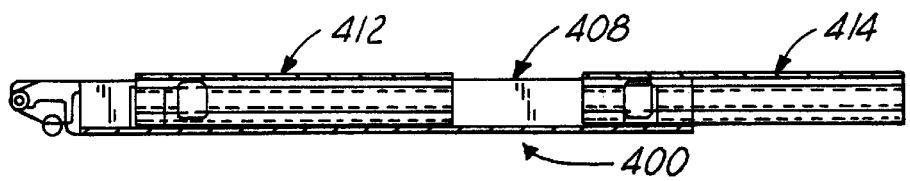
FIG. 23 is a simplified CAD drawing cross sectional view taken generally on the line 23—23 of FIG. 21.

FIGS. 22–29 illustrate components of a second embodiment electric seat slide and actuator system of the invention. The second embodiment system utilizes essentially the same components as employed in the first embodiment system, but provides a greater length dimension in the rail and greater slide bearing range by the use of two longitudinally spaced slides on each rail to thereby accommodate a greater load carrying dimension longitudinally of the rail. Also, as seen in FIG. 21, the port and starboard rail/slide subassemblies 400 and 402 are widely spaced laterally from one another, and this is accommodated by utilizing suitable extended lengths of shrouded drive shafts 404 and 406. Note that the drive reduction units 256 are mounted with brackets 258 inverted or rotated 180° from their mounting shown in the first embodiment system of FIGS. 1 and 3, thereby further illustrating the versatility of the system design in this regard.

Each of the rail/slide assemblies 400 and 402 utilizes one rail 408 and 410 respectively that may be economically made in the same extrusion dies as rails 106 and 110. In addition, each of the rail/slide assemblies 400 and 402 utilizes two slides instead of one, namely an aft slide 412 and a forward slide 414 mounted longitudinally spaced apart on rail 408 but operable in same manner as in the first system of FIGS. 1–20. Each slide thus has its own lead screw drive nut 280 associated therewith threadably received on a common lead screw 140 so that the two slides are driven for synchronized travel in unison. Likewise, the tandem hookup of motor 100 to the port and starboard rail/slide subassemblies insures synchronized drive of both sides of the entire system, similar to that described in conjunction with the first embodiment system.

Figure 24:
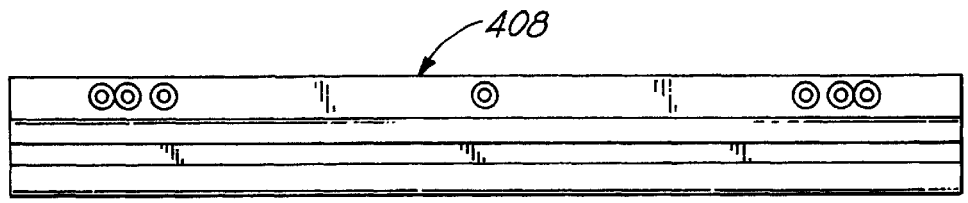
FIG. 24 is a top plan view of the port rail of the port slide/rail subassembly in FIG. 21 (assuming a fore and aft travel mounting with motor aft).
Figure 25:
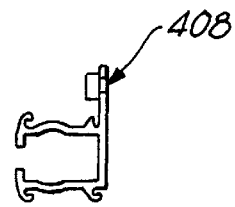
FIG. 25 is an end projection of the port rail shown in FIG. 24.
Figure 26:
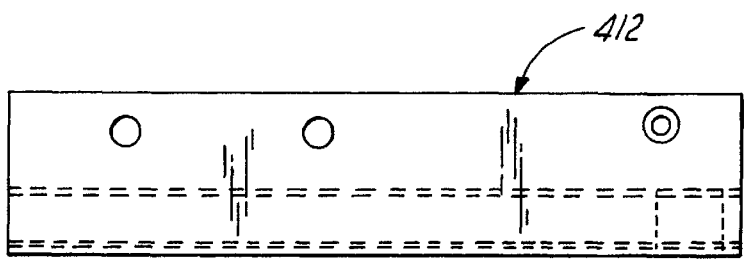
FIG. 26 is a top plan view of the aft one of the two slides shown on the port rail of the assembly FIG. 21.
Figure 27:
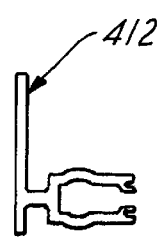
FIG. 27 is end elevation projection of the slide of FIG. 26.
Figure 28:
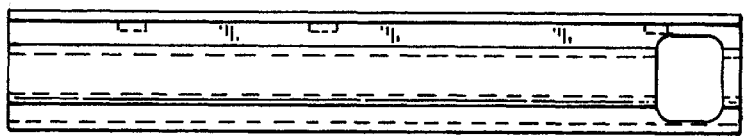
FIG. 28 is a side elevational view of the slide shown in FIG. 26.
Figure 29:
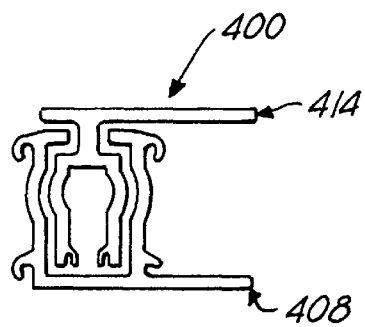
FIG. 29 is a simplified end elevational view illustrating the assembled relationship of the slide and rail of FIGS. 24–28 without lead screw, lead screw nut and slide bearing glides.

FIGS. 24 and 25 illustrate rail 408 of the port side rail/slide assembly 400. As will be evident from FIG. 21, the starboard side rail 410 is identical and turned around as a mirror image in assembly but constructed identically during manufacture of this component. Likewise as to each of the slides 412 and 414, one of the slides 412 being illustrated in FIGS. 26, 27 and 28. The same component is made identically and used as the slide for slides 414 of the port assembly 400 and for each of the slides 414 and 420 of the starboard rail/slide assembly 402 It will be understood that the slide 412 as shown in FIGS. 26 and 28 is turned around ends for end from its showing in FIG. 23.

Experimental Prototype Hardware

Figure 30:
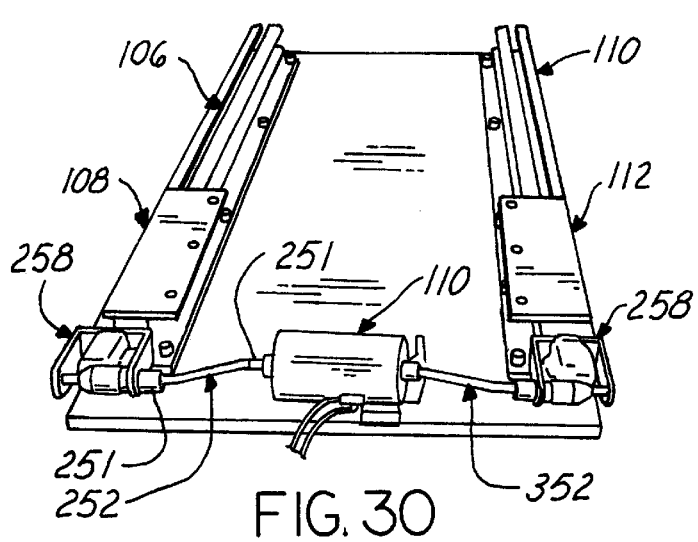
FIG. 30 is a perspective view of an actual experimental prototype assembly looking forward from the motor end of the assembly of the components generally as shown in FIG. 1 but with the components reoriented such that the mounting flanges of the slides and rails are both oriented inboard, as in the FIG. 17 orientation, and with the gear reduction brackets and associated gear reduction drives rotated 180° from their orientation in the system assembly FIGS. 1–6 such that the dual tandem drive cables from the motor are trained beneath the inboard arm of the associated mounting bracket.
Figure 31:
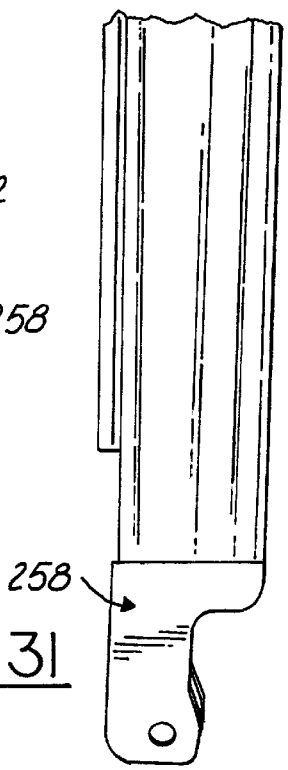
FIG. 31 is a fragmentary side elevational view of the aft end of the outboard side of the starboard rail and slide subassembly of FIG. 30 with the gear reduction drive removed from the mounting bracket.
Figure 32:
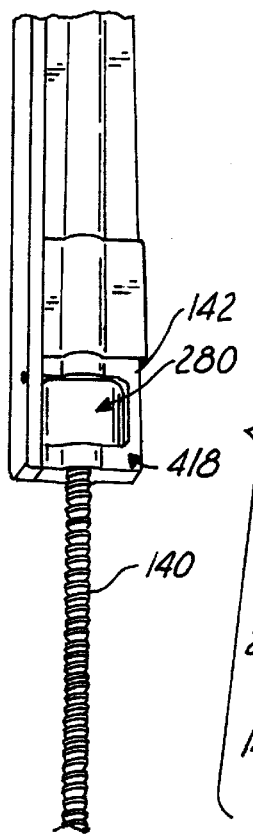
FIG. 32 is a reproduction from a photo print of the actual parts of a subassembly of a slide, lead screw and lead screw nut of the system of FIGS. 21–23, with a bearing glide mounted on the slide, these parts having been constructed as actual operating parts in experimental prototype of the system of FIGS. 21–23.
Figure 33:
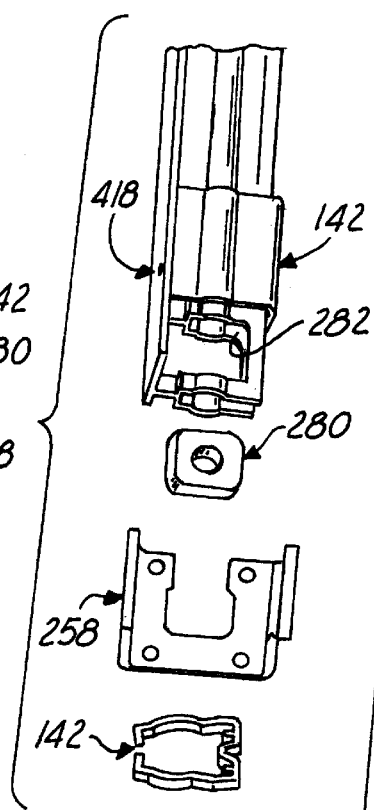
FIG. 33 is a reproduction of a photo print showing the slide part of FIG. 32 with the slide bearing glide mounted thereon but with the lead screw removed, the lead screw nut along with the gear reduction drive mounting bracket being shown separated, and another slide bearing glide shown on end in its free state condition.
Figure 34:
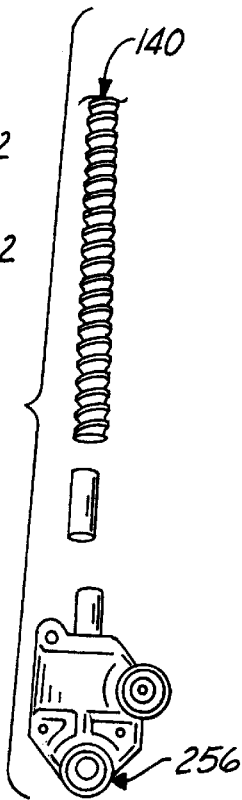
FIG. 34 is a reproduction of a photo print of the gear reduction drive, a connecting stubshaft and a lead screw of FIG. 32 and shown separated before being welded in assembly together, with these parts being shown laid out separately from one another.
Figure 35:
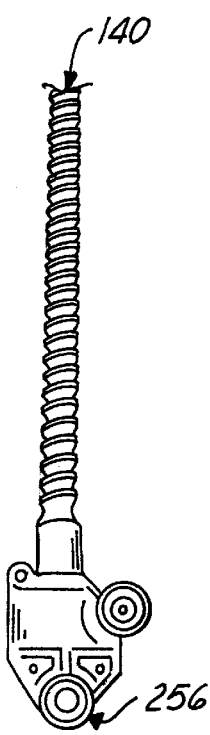
FIG. 35 is a reproduction of a photo print of the subassembly of the gear reduction unit and lead screw of FIG. 34 coupled in driving relation.
Figure 38:
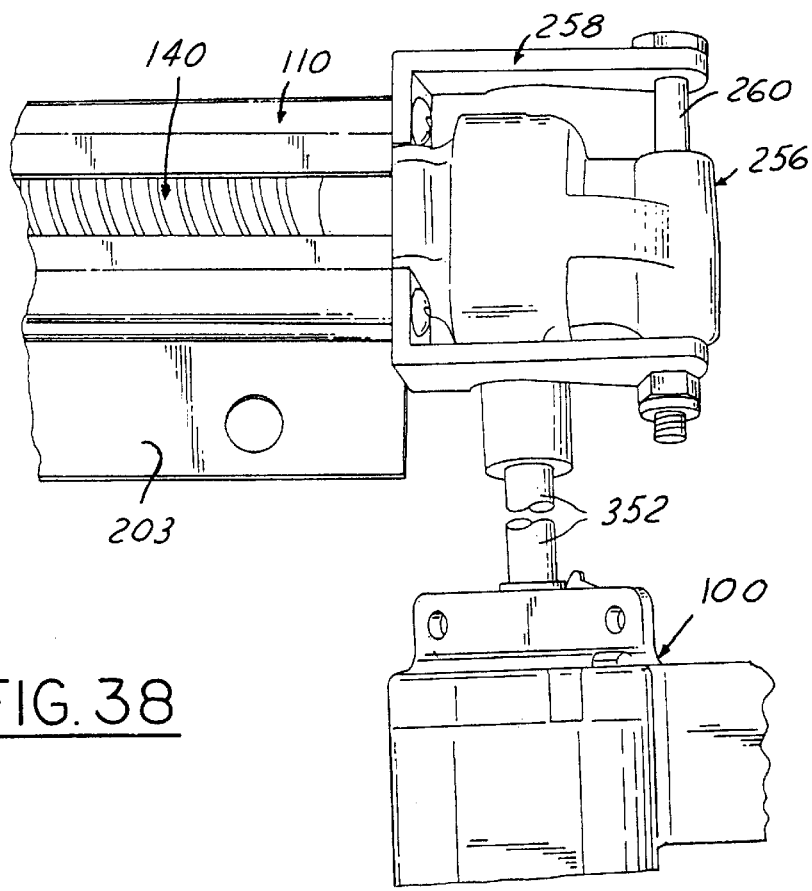
FIG. 38 is a fragmentary top plan view reproduced from a photo print of the components shown in FIG. 36 (minus the slide).
Figure 39:
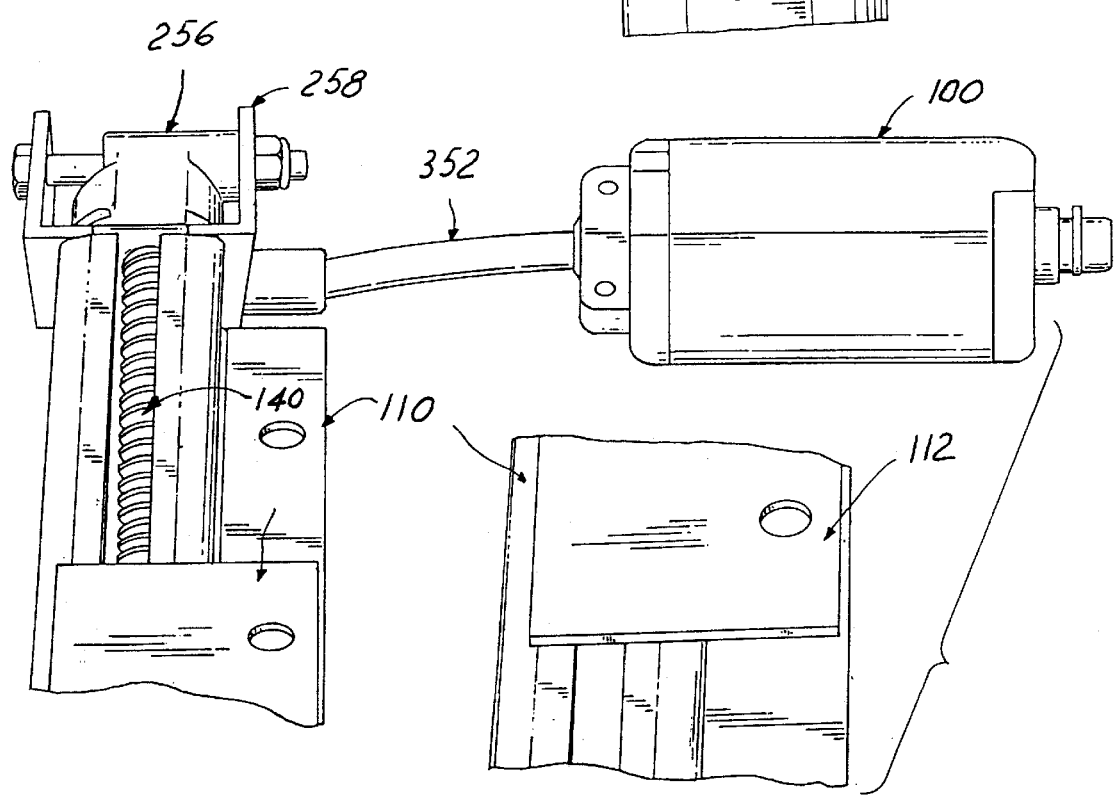
FIG. 39 is a fragmentary split view, looking aft, of the components shown in FIG. 36 as reproduced from a photo print of actual prototype parts constructed and arranged as shown in FIG. 30.

FIGS. 30–39 illustrate, by graphic line drawing reproductions of photographic prints, various features and facets of experimental operational prototype hardware constructed in accordance with the foregoing description as referenced in conjunction with FIGS. 1–29 and hereby incorporated by reference to these photo print reproductions. Thus, FIG. 30 illustrates a system assembly set up like FIG. 1 but with the port and starboard rails and associated slides assembled and oriented as shown in FIG. 17. Note that the reduction drive brackets are mounted as shown in the second embodiment system for tandem drive off the single motor 100. Reference numerals from FIGS. 1–29 are thus applied to FIGS. 30–39 and therefore the description of the illustrated components not repeated.

Third Embodiment System

Figure 40:
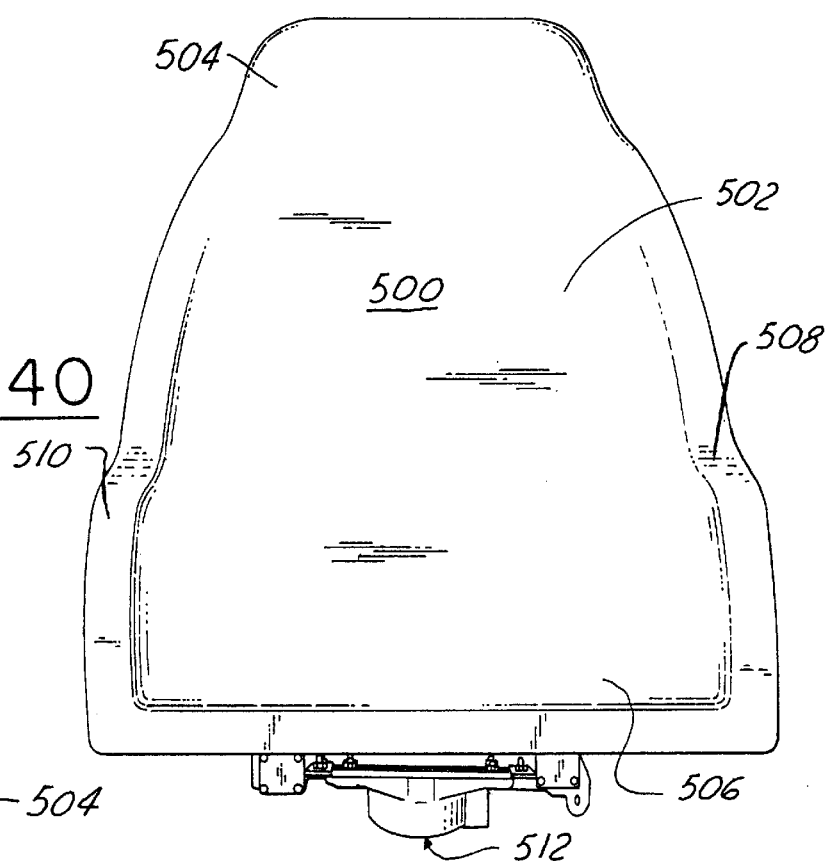
FIG. 40 is a front elevational view of a molded plastic single seat body mounted on a third embodiment electric seat slide and actuator system of the invention that in turn is mounted on a conventional cast swivel mount spider support.
Figure 41:
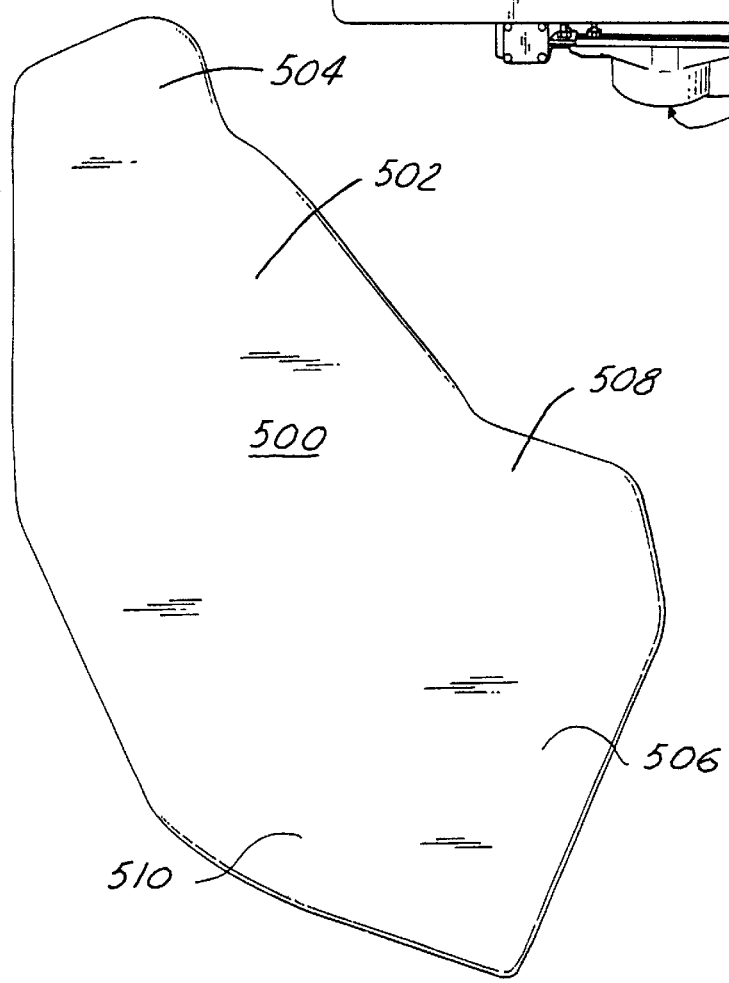
FIG. 41 is a perspective view of the assembly shown in FIG. 40 as the subassembly is viewed looking aft and to port.

FIGS. 40–44 illustrate a third embodiment system of the invention wherein a single side drive is employed to activate and actuate a power adjustable and dual rail/slide supported single-person seat that is also mounted for swivel action, i.e., rotation about a vertical axis. As shown in FIGS. 40 and 41 the seat is a conventional one-piece molded member in the style of a captain's chair 500 having a back 502, a head rest portion 504, a seat portion 506 and side arm portions 508 and 510. In FIG. 40 the third embodiment power seat adjustment and swivel mechanism 512 is partially visible below the seat bottom 506. In FIG. 41 this mechanism and associated swivel mounting structure is essentially hidden by the seat.

Figure 42:
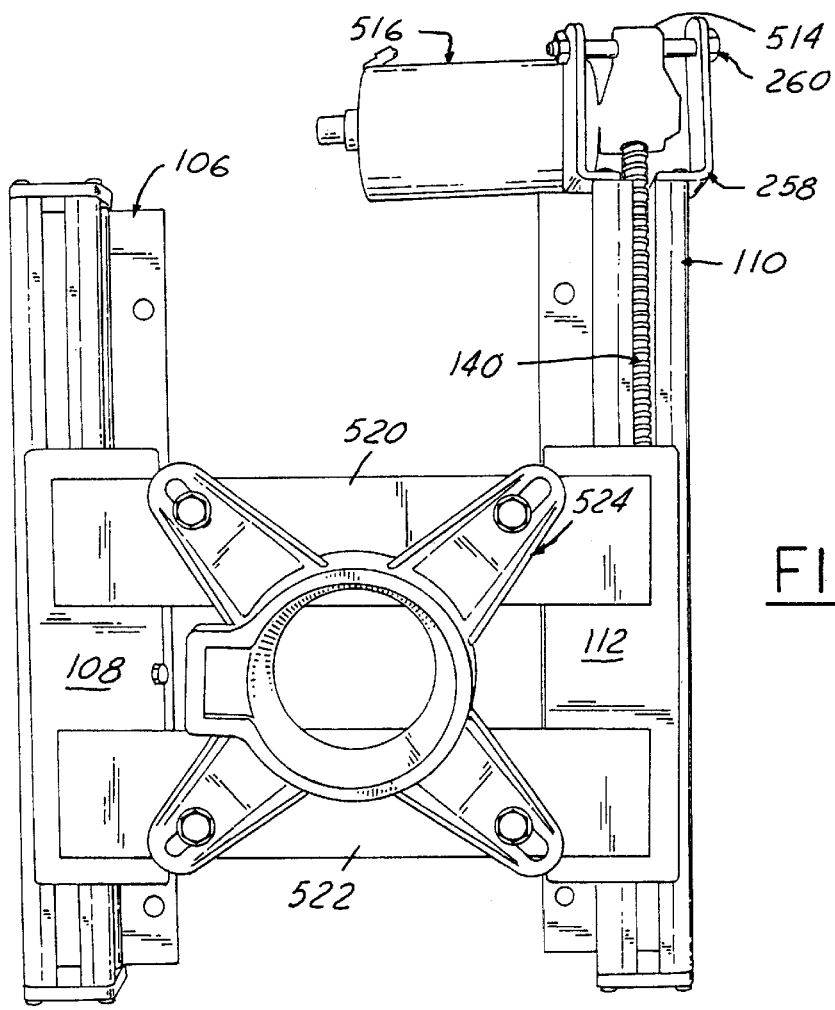
FIG. 42 is a bottom plan view, as reproduced from a photo print of prototype parts in assembly, of the third embodiment electric seat slide and actuator system removed from the seat but with the swivel spider still mounted on the actuator assembly.
Figure 43:
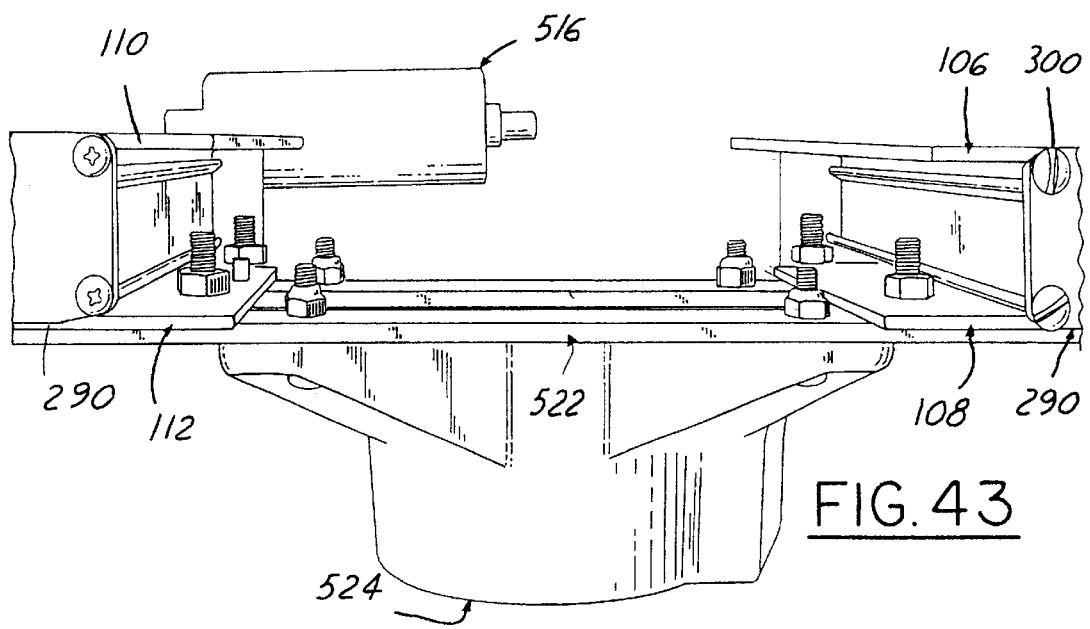
FIG. 43 is a perspective view in front elevation of the subassembly shown in FIG. 42, but oriented upright.
Figure 44:
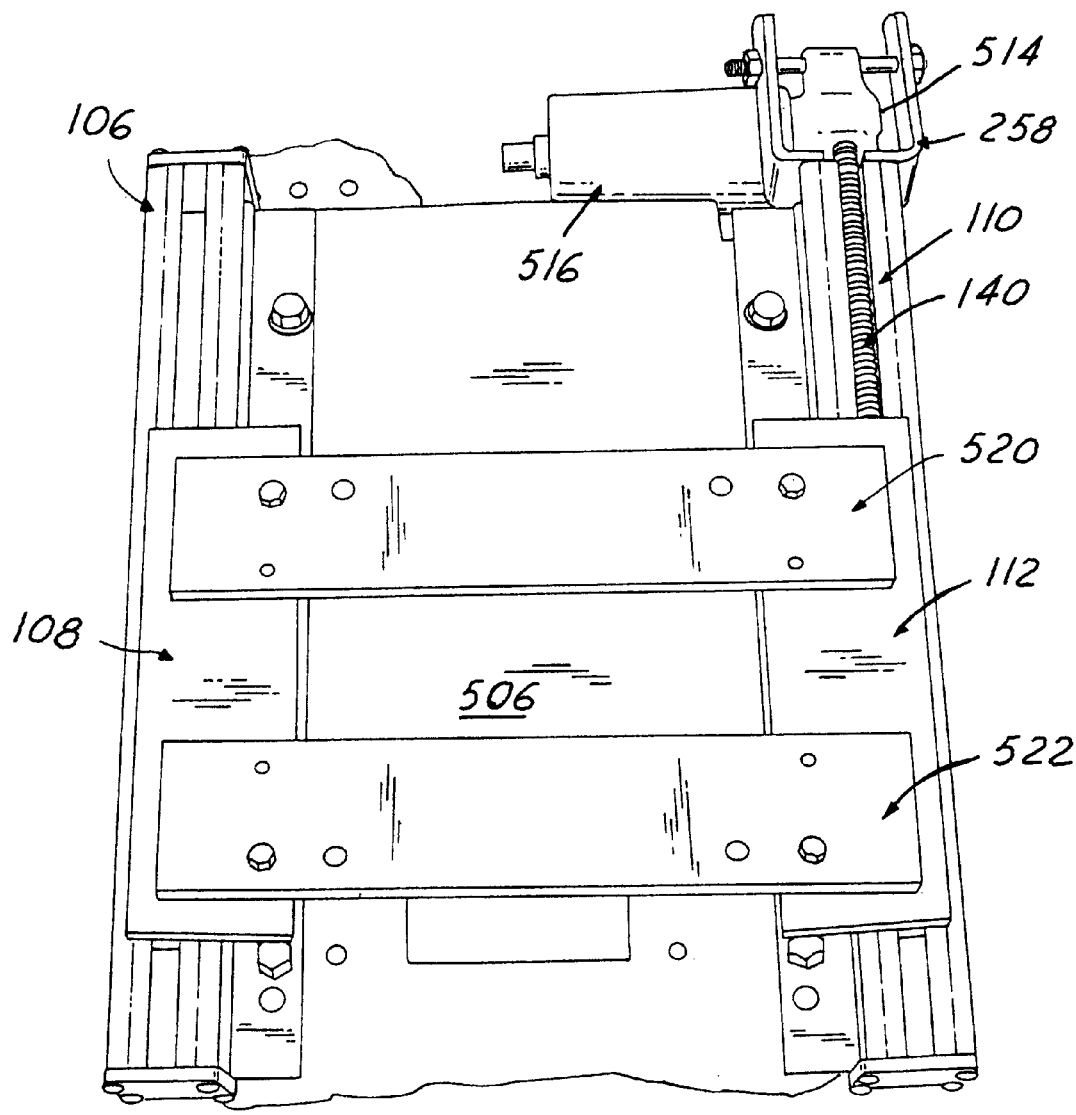
FIG. 44 is a bottom plan view of the bottom side of the seat slide and actuator system of FIG. 42 shown mounted to the bottom of the seat shown in FIGS. 40 and 41, but with the swivel spider removed from the cross braces of the assembly, FIGS. 40–44 being drawings reproduced from photo prints of these parts as actual working parts so oriented in an actual experimental prototype.

FIGS. 42 and 43 illustrate the third embodiment electric seat slide and actuator system de-mounted from seat 500, the system components being shown upside down in FIG. 42 and in vertical right-side-up front elevation in FIG. 43. Note that the port slide and rail assembly utilizes the same rail 106 and slide 108 as in the first embodiment system (FIG. 1), but with the mounting flange extensions of the rail and slide facing inboard as in the orientation of FIG. 17. Likewise, the starboard rail and slide subassembly utilizes the starboard rail 110 and starboard slide 112 components of the FIG. 1 system, as well as the mounting bracket 258 to operably mount a right angle drive unit 514. However drive unit 514 is part of a combined motor and drive unit and thus mounts the associated drive motor 516 of a commercially available combination motor and reduction drive unit. Hence, motor 516 also receives its support from the mounting bolt 260 of bracket 258 that supports the gear reduction unit to 514. This third embodiment system thus does not employ a flexible drive cable, and also only employs one lead screw driven off the motor mounted directly on the port side rail and slide subassembly 110/112. As another difference, note that the starboard side slide 108 is slave-driven off of slide 112 by fastening a pair of two rigid cross piece plates 520 and 522 at their ends to the mounting platform of the slides 108 and 112, as shown in FIG. 42. The fastenings of the ends of the plates and their width dimension may be used to rigidity the dual rail and slide assembly and make it possible to transmit driving force from slide 112 over to slide 108 without undue cocking or lock up forces being developed for medium rated loads.

In order to provide sea swivel capability, a standard conventional cast swivel spider 524 is mounted as shown in FIG. 42 with two of its legs bolted to cross brace 520 and the other two legs bolted at their ends to cross brace 522. The center of rotation of swivel fixture 524 is centered between the two cross braces 520 and 522 and likewise centered laterally between two slides 108 and 112. Note that the four legs of the swivel casting, by their attachment to the two cross braces 520 and 522, serve to maintain the parallelism of these two cross braces 520 and 522 independently of their mounting support fastening arrangement on slides 108 and 112. Hence, only one mounting bolt is needed to attach each end of each cross brace to the associated slide, as will be evident from FIGS. 42 and 43, as well as FIG. 44.

The third embodiment system of FIGS. 40–44 thus consists of a seat for one person that is mounted on a pedestal for swivel rotation about a vertical axis. A single motor attached to one of the rail/slide assemblies drives both assemblies together by slave driving the non-lead screw slide-rail assembly through the cross-over bridge plates 520 and 522. Preferably the port and starboard rail/slide assemblies are laterally spaced apart no greater than 22 inches to prevent undue racking or lock up forces being exerted. On the other hand, the two rail assemblies are spaced preferably at least 8 inches apart in the example shown in order to limit wobble and flexing of the seat on the dual rail slide mounts. Within these constraints the third embodiment system provides a power actuated, swivel-type single person eat system at reduced cost due to the elimination of one lead screw, one drive nut, one gear reduction unit and one drive shaft. However, it is believed that for most applications the single motor tandem dual drive employed in the first and second embodiment systems is preferred since it enables much more flexibility in rail spacing and load driving capability without lock up or undue racking from unbalanced resistance forces and/or weight loading forces. Preferably drive screw 140 utilizes an Acme thread and, as indicated previously, is made of high strength steel or stainless steel, whereas lead screw drive nut 280 is preferably made of a plastic material such as nylon or may be made of a non-ferrous material such as brass.

From the foregoing description and appended drawings, it will now be evident to those of ordinary skill in the art that the electric seat slide and actuator system embodiments of the invention amply fulfill one or more of the aforestated objects and provide many advantages and features over the prior art, such as those stated previously. However, it will also be understood that the invention has many equivalent features and applications other than those illustrated which will be apparent and useful to those skilled in the art without departing from the spirit and scope of the invention and as set forth in the appended claims.

What is claimed is:

1. An electro-mechanical linear drive system for moving a load along a linear travel path comprising:

(a) an elongate hollow rail adapted for mounting to a fixed supporting structure, (b) an elongate hollow slide non-rotatably mounted within the interior of said rail with the longitudinal axis of said slide oriented parallel to the longitudinal axis of said rail and slidably movable axially along said rail, in a linear travel path, said slide being adapted to be coupled to the load for moving the same in response to movement of said slide in the travel path along said rail, (c) a lead screw rotatably mounted within said slide and said rail and extending axially there of for the length of the slide travel path along said rail, (d) a traveling nut drivingly and non-rotatably engaged with said slide and threadably received on said lead screw for moving said slide in response to rotation of said lead screw, (e) a gear reduction drive unit fixedly mounted on said rail and having a rotary output member driving coupled to one end of said lead screw for rotating the same while holding the same against axial motion, and (f) an electric motor having an output shaft rotationally drivingly coupled to a rotary input member of said gear drive unit for producing rotation of said lead screw via said gear drive unit in response to motor rotation.

2. The drive system set forth in claim 1 wherein the cross-sectional configurations of said rail and that of said slide are non-circular and complementary for restraining rotation of said slide about said axis relative to said rail.

3. The system set forth in claim 2 wherein said rail has a slot opening extending axially along said rail for at least the distance of the travel path, and wherein said slide has a web member protruding from said slide from the interior of said rail through said slot to the exterior of said rail, said web member being arranged and constructed for coupling said slide to the load.

4. The system set forth in claim 3 wherein said rail and slide are formed as extrusions with the direction of extrusion being parallel to the longitudinal axes of said rail and slide.

5. The system set forth in claim 4 wherein said rail has a body portion that is generally rectangular in cross-sectional configuration as defined by a bottom wall, a pair of spaced apart generally parallel side walls oriented generally perpendicular to and integrally joined to said bottom wall, and a top wall integrally joined to said side walls and oriented generally parallel to sail bottom wall, said top wall having said slot opening therein.

6. The system set forth in claim 5 wherein said rail bottom wall has a laterally extending mounting web flange portion protruding therefrom along one longitudinal side edge of, and as an integral extension of said rail bottom wall and being oriented generally co-planar therewith exteriorly of said rail so as to be clear of obstruction by said rail body portion.

7. The system set forth in claim 6 wherein said slide has a top wall integrally joined to said slide web and being oriented generally perpendicular thereto and a pair of spaced apart generally parallel side integrally joined one to each side edge of said slide top wall and flanking the lead screw therebetween.

8. The system set forth in claim 7 wherein said slide web has a planar mounting platform oriented generally perpendicular to said web and integrally joined to an edge portion thereof disposed exteriorly of said rail and oriented in superposed relation thereto.

9. The system set forth in claim 8 wherein said slide web mounting platform has a coplanar lateral extension mounting flange portion generally superposed to said rail and protruding laterally from one si edge of said slide mounting platform as an integral extension thereof so as to be clear of obstruction by said rail body portion.

10. The system set forth in claim 9 wherein said slide side walls have curved sections defining laterally opposed interiorly facing concave surfaces formed one in each slide side wall and oriented concentric with and nesting therebetween said lead screw.

11. The system set forth in claim 10 wherein said rail side walls have curved sections defining laterally opposed interiorly facing concave surfaces formed one in each rail side wall and oriented concentric with and nesting therebetween said curved sections of said slide side walls.

12. The system set forth in claim 11 wherein said slide has at least two glides fixedly carried on the exterior thereof, one adjacent each of longitudinally opposite ends thereof, each said glide having a cross-sectional configuration generally complemental to that of the exterior surfaces of said slide and the interior surfaces of said rail and generally forming a slide bearing for sliding engagement with said rail interior surfaces.

13. The system set forth in claim 12 wherein each said glide is molded or extruded from plastic material having a low coefficient of friction and a free-state configuration adapted to be flex stressed when in assembly on said slide and being shaped to provide slide bearing zones adjacent each of four zones of said slide wall generally juxtaposed individually to four corners of said rail body rectangular cross section.

14. The system set forth in claim 13 wherein each said glide is made of self-lubricating plastic material, and said rail and slide are extruded from metallic aluminum material.

15. The system set forth in claim 14 wherein said slide side walls have laterally opposite nut openings therein, and said lead screw nut protrudes outwardly through and is non-rotatably engaged in said nut opening to provide the nut-to-slide driving engagement for imparting motion to said slide in response to threaded travel of said lead screw nut along said lead screw.

16. The system set forth in claim 15 wherein said each longitudinal side edge of said rail top wall has a re-entrant curved channel portion extending outwardly from the respectively adjacent rail side wall to provide a smooth rounded contour to each said rail top wall outer longitudinal edges and to define internally of each said channel portion of mounting screw opening at each of the longitudinally opposite ends of said rail.

17. The system set forth in claim 16 wherein the exterior surface of each of said rail side walls has a re-entrantly curved and laterally protruding rib disposed closely adjacent said rail bottom wall and defining a channel forming internally thereof a mounting screw opening at each of the longitudinally opposite ends of said rail.

18. The system set forth in claim 17 wherein said each slide side wall terminates in a free edge remote from said slide web wall and extends longitudinally of said slide, said slide side wall free edge being juxtaposed in assembly to said rail bottom wall and having, a slot therein opening toward said rail bottom wall, and wherein said glide has a pair of ribs protruding one into each of said free edge slots.

19. The system set forth in claim 18 wherein said glide has a laterally folded portion protruding interiorly of said slide in the space between said slide side wall free edges and serving as a folded spring having the capability to compensate for dimensional variations in the slide extrusion profile and in the molded plastic glide.

20. An electric seat actuator system wherein two of said linear drive systems of claim 1 are arranged in spaced apart side-by-side orientation with the longitudinal axes of said rails extending parallel to one another, and wherein said motor has a pair of output shafts, one at each axially opposite ends of said motor, each of said motor shafts being drivingly coupled to an associated one of said gear reduction drive units such that said motor drives both lead screws of said two drive systems in synchronism.

21. An electric seat actuator system including in combination a first linear drive system constructed pursuant to claim 1 and second linear drive system comprising a rail and slide subassembly constructed as set forth in clauses (a) and (b) of claim 1, said first and second drive systems having their respective rails arranged in spaced apart side-by-side orientation, the longitudinal axes of said rails extending parallel to one another, and wherein cross bracing is rigidly connected to and spans between said slides of said slide-and-rail subassemblies of said first and second drive systems to thereby slave drive the slide of said second drive system.

22. An electro-mechanical dual linear drive system for moving a load along a linear travel path comprising:
(a) first and second rails each comprising an elongate hollow rail adapted for mounting to a fixed supporting structure with the longitudinal axes of said rails supported in parallelism,
(b) first and second slides each comprising an elongate hollow slide non-rotatably mounted respectively within the interior of said first and second rails with its longitudinal axis oriented parallel to that of said respective rail and slidably movable therealong in a linear travel path, said slides being adapted to be coupled to the load for moving the same in response to movement of said slides in their respective travel paths along said respective rails,
(c) first and second lead screws respectively rotatably mounted within said first and second slides and rails and extending axially thereof for the length o the respective slide travel path along said respective rail,
(d) first and second traveling nuts respectively drivingly and non-rotatably engaged with said first and second slides and threadably received respectively on said first and second lead screws for moving said respective slides in response to rotation of said respective lead screw,
(e) first and second gear reduction drive units respectively fixedly mounted on sad first and second rails and each having a rotary output member driving coupled to one end of said respective lead screw for rotating the same while holding the same against axial motion, and
(f) an electric motor having an output shaft rotationally drivingly coupled to a rotary input member of each said gear reduction drive unit for producing rotation of said lead screws via said gear drive units in response to motor rotation.

23. The dual drive system set forth in claim 22 wherein the cross-sectional configurations of each said rail and that of each said slide are non-circular and complementary for restraining rotation of said slide about said axis relative to said rail.

24. The dual drive system set forth in claim 23 wherein said rail has a slot opening extending axially therealong for at least the distance of the respective slide travel path, and wherein each said slide has a web member protruding from the interior to the exterior of said respective rail through said slot, said web member being arranged and constructed for coupling said respective slide to the load.

25. The dual drive system set forth in claim 24 wherein each said rail and slide are formed as extrusions with the direction of extrusion being parallel to the longitudinal axes of said rail and slide.

26. The dual drive system set forth in claim 25 wherein each said rail has a body portion that is generally rectangular in cross-sectional configuration as defined by a bottom wall, a pair of spaced apart generally parallel side walls oriented generally perpendicular to and integrally joined to said bottom wall, and a top wall integrally joined to said side walls and oriented generally parallel to said bottom wall, said top wall having said slot opening therein.

27. The dual drive system set forth in claim 26 wherein each said rail bottom wall has a laterally extending mounting flange portion protruding therefrom along one longitudinal side edge of, and as an integral extension of, said respective rail bottom wall and being oriented generally co-planar therewith so as to be clear of obstruction by said respective rail body portion.

28. The dual drive system set forth in claim 27 wherein each said slide has a top wall integrally joined to said respective slide web and being oriented generally perpendicular thereto and a pair of spaced apart generally parallel side walls integrally joined one to each side edge of said respective slide top wall and flanking respective the lead screw therebetween.

29. The dual drive system set forth in claim 28 wherein each said slide web has a planar mounting platform oriented generally perpendicular to said web and integrally joined to an edge portion thereof disposed exteriorly of said respective rail and oriented in superposed relation thereto.

30. The dual drive system set forth in claim 29 wherein each said slide web mounting platform has a coplanar lateral extension mounting flange portion generally superposed to said respective rail and protruding laterally from one side edge of said respective slide mounting platform as an integral extension thereof so as to be clear of obstruction by said rail body portion.

31. The dual drive system set forth in claim 30 wherein said slide side walls of each said slides have curved section defining laterally opposed interiorly facing concave surfaces formed one in each respective slide side wall and oriented concentric with and nesting therebetween said respective lead screw.

32. The dual drive system set forth in claim 31 wherein said rail side walls of each said rail have curved sections refining laterally opposed interiorly facing concave surfaces formed one in each rail side wall and oriented concentric with and nesting therebetween said curved sections of said respective slide side walls.

33. The dual drive system set forth in claim 24 wherein each said slide has at least two glides fixedly carried on the exterior hereof, one adjacent each of longitudinally opposite ends thereof, each said glide encircling all but said web member of said slide and having a cross-sectional configuration generally complemental to that of the exterior surfaces of said slide and the interior surfaces of said respective rail and generally forming a slide bearing for sliding engagement with said respective rail interior surfaces.

34. The dual drive system set forth in claim 33 wherein each said glide is molded or extruded from plastic material having a low coefficient of friction and a free-state configuration adapted to be flex stressed when in assembly on said slide and being shaped to provide a plurality of slide bearing zones spaced around the exterior periphery of said glides.

35. The dual drive system set forth in claim 34 wherein each said glide is made of self-lubricating plastic material, and each said rail and slide is extruded from metallic aluminum material.

36. The dual drive system set forth in claim 26 wherein said slide side walls of each said slide have laterally opposite nut openings therein, and each said lead screw nut protrudes outwardly through and is non-rotatably engaged in said respective nut opening to provide the respective nut-to-slide driving engagement for imparting motion to said respective slide in response to threaded travel of said respective lead screw nut along said respective lead screw.

37. The dual drive system set forth in claim 22 wherein said each longitudinal side edge of each said rail top wall has a re-entrant curved channel portion extending outwardly from the respectively adjacent rail side wall to provide a smooth rounded contour to each said rail top wall outer longitudinal edges and to define internally of each of said channel portion a mounting screw opening at each of the longitudinally opposite ends of each said rail.

38. The dual drive system set forth in claim 37 wherein the exterior surface of each of said rail side walls of each said rail has a re-entrantly curved and laterally protruding rib disposed closely adjacent said respective rail bottom wall and defining a channel forming internally thereof a mounting screw opening at each of the longitudinally opposite ends of each sad rail.

39. The dual drive system set forth in claim 36 wherein said each slide side wall of each said slide terminates in a free edge remote from said respective slide web wall and extends longitudinally of said respective slide, each said slide side wall free edge being juxtaposed in assembly to said respective rail bottom wall and having a slot therein opening toward said respective rail bottom wall, and wherein each said glide has a pair of ribs protruding one in to each of said free edge slots of said respective slide and wherein a portion of each said slide side wall free edge is crimped to secure each sad glide against movement along said respective slide.

40. The dual drive system set forth in claim 36 wherein each said glide has a laterally folded portion protruding interiorly of said respective slide in the space between said slide side wall free edges of said respective slide side walls and serving as a folded spring to compensate for dimensional variations in the respective slide extrusion profile and/or in the respective molded plastic glide.

41. An electro-mechanical linear drive system for moving a load along a linear travel path comprising:
(a) an elongate hollow rail,
(b) an elongate hollow slide non-rotatably mounted within the interior of said rail with the longitudinal axis of said slide oriented parallel to the longitudinal axis of said rail and slidably relatively movable axially along said rail, in a linear travel path, one of said slide and rail being adapted to be coupled to the load for moving the same in response to relative movement of said slide and rail in the travel path, and the other of said slide and rail being adapted for fixedly mounting to a fixed supporting structure,
(c) a lead screw rotatably mounted within said slide and said rail and extending axially thereof for the length of the travel path along said rail,
(d) a traveling nut drivingly and non-rotatably engaged with said slide and threadably received on said lead screw for relatively moving said slide with respect to said rail in response to rotation of said lead screw,
(e) a gear reduction drive unit fixedly mounted on said rail and having a rotary output member driving coupled to one end of said lead screw for rotating the same while holding the same against axial motion, and an electric motor having an output shaft rotationally drivingly coupled to a rotary input member of said gear drive unit for producing rotation of said lead screw via said gear drive unit in response to motor rotation, and wherein the cross-sectional configurations of said rail and that of said slide are non-circular and complementary for restraining rotation of said slide about said axis relative to said rail, said rail having slot opening extending axially along said rail for at least the distance of the travel path, and wherein said slide has a web member protruding from said slide from the interior of said rail through said slot to the exterior of said rail, said web member being arranged and constructed for coupling said slide to one of the load and the fixed supporting structure, said rail and slide being formed as extrusions with the direction of extrusion being parallel to the longitudinal axes of said rail and slide, said rail having a body portion that is generally rectangular in cross-sectional configuration as defined by a first wall, a pair of spaced apart generally parallel side walls oriented generally perpendicular to and integrally joined to said first wall, and a second wall integrally joined to said side walls and oriented generally parallel to said first wall, said second wall having said slot opening therein, said rail first wall having a laterally extending mounting web flange portion protruding therefrom along one longitudinal side edge of, and as an integral extension of said rail first wall and being oriented generally co-planar therewith exteriorly of said rail so as to be clear of obstruction by said rail body portion, said slide having a first wall integrally joined to said slide web and being oriented generally perpendicular thereto and a pair of spaced apart generally parallel side walls integrally joined one to each side edge of said slide first wall and flanking the lead screw therebetween, and said slide web having a planar mounting platform oriented generally perpendicular to said web and integrally joined to an edge portion thereof disposed exteriorly of said rail and oriented in juxtaposed relation thereto.

42. The system set forth in claim 41 wherein said slide web mounting platform has a coplanar lateral extension mounting flange portion generally juxtaposed to said rail and protruding laterally from one side edge of said slide mounting platform as an integral extension thereof so as to be clear of obstruction by said rail body portion.

43. The system set forth in claim 42 wherein said slide side walls have curved sections defining laterally opposed interiorly facing concave surfaces formed one in each slide side wall and oriented concentric with and nesting therebetween said lead screw.

44. The system set forth in claim 43 wherein said rail side walls have curved sections defining laterally opposed interiorly facing concave surfaces formed one in each rail side wall and oriented concentric with and nesting therebetween said curved sections of said slide side walls.

45. The system set forth in claim 44 wherein said slide has at least two glides fixedly carried on the exterior thereof, one adjacent each of longitudinally opposite ends thereof, each said glide having a cross-sectional configuration generally complemental to that of the exterior surfaces of said slide and the interior surfaces of said rail and generally forming a slide bearing for sliding engagement with said rail interior surfaces.

46. The system set forth in claim 45 wherein each said glide is molded or extruded from plastic material having a low coefficient of friction and a free-state configuration adapted to be flex stressed when in assembly on said slide and being shaped to provide slide bearing zones adjacent each of four zones of said slide wall generally juxtaposed individually to four corners of said rail body rectangular cross section.

47. The system set forth in claim 45 wherein each said glide is made of self-lubricating plastic material, and said rail and slide are extruded from metallic aluminum material.

48. The system set forth in claim 47 wherein said slide side walls have laterally opposite nut openings therein, and said lead screw nut protrudes outwardly through and is non-rotatably engaged in said nut opening to provide the nut-to-slide driving engagement for imparting relative motion to said slide in response to threaded relative travel of said lead screw nut along said lead screw.

49. The system set forth in claim 48 wherein said each longitudinal side edge of said rail first wall has a re-entrant curved channel portion extending outwardly from the respectively adjacent rail side wall to provide a smooth rounded contour to each said rail first wall outer longitudinal edges and to define internal of each of said channel portion a mounting screw opening at each of the longitudinally opposite ends of said rail.

50. The system set forth in claim 49 wherein the exterior surface of each of said rail side walls has a re-entrantly curved and laterally protruding rib disposed closely adjacent said rail second wall and defining a channel forcing internally thereof a mounting screw opening at each of the longitudinally opposite ends of said rail.

51. The system set forth in claim 50 wherein said each slide side wall terminates in a free edge remote from said slide web wall and extends longitudinally of said slide, said slide side wall free edge being juxtaposed in assembly to said rail second wall and having a slot therein opening toward said rail second wall, and wherein said glide has a pair of ribs protruding one into each of said free edge slots.

52. The system set forth in claim 51 wherein said glide has a laterally folded portion protruding interiorly of said slide in the space between said slide side wall free edges and serving as a folded spring having the capability to compensate for dimensional variations in the slide extrusion profile and in the molded plastic glide.

53. An electric seat actuator system wherein two of said linear drive systems of claim 41 are arranged in spaced apart side-by-side orientation with the longitudinal axes of said rails extending parallel to one another, and wherein said motor has a pair of output shafts, one at each axially opposite ends of said motor, each of said motor shafts being drivingly coupled to an associated one of said gear reduction drive units such that said motor drives both lead screws of said two drive systems in synchronism.

54. An electric seat actuator system including in combination a first linear drive system constructed pursuant to claim 41 and second linear drive system comprising a rail and slide subassembly constructed as set forth in clauses (a) and (b) of claim 1, said first and second drive systems having their respective rails arranged in spaced apart side-by-side orientation, the longitudinal axes of said rails extending parallel to one another, and wherein cross bracing is rigidly connected to and spans between one of said slides and said rails of said slide-and-rail subassemblies of said first and second drive systems to thereby slave drive said second drive system.

55. A rail and slide subcombination adapted for use in an electromechanical dual linear drive system for moving a load along a linear travel path comprising:
(a) an elongate hollow rail,
(b) an elongate hollow slide non-rotatably mounted within the interior of said rail with the longitudinal axis of said slide oriented parallel to the longitudinal axis of said rail and slidably relatively movable axially along said rail, in a linear travel path, one of said slide and rail being adapted to be coupled to the load for moving the same in response to relative movement of said slide and rail in the travel path, and the other of said slide and rail being adapted for fixedly mounting to a fixed supporting structure,
(c) a lead screw rotatably mounted within said slide and said rail and extending axially thereof for the length of the travel path along said rail, and
(d) a traveling nut drivingly and non-rotatably engaged with said slide and threadably received on said lead screw for relatively moving said slide with respect to said rail in response to rotation of said lead screw, and wherein the cross-sectional configurations of said rail and that of said slide are non-circular and complementary for restraining rotation of said slide about said axis relative to said rail, said rail having a slot opening extending axially along said rail for at least the distance of the travel path, and wherein said slide has a web member protruding from said slide from the interior of said rail through said slot to the exterior of said rail, said web member being arranged and constructed to be adapted for coupling said slide to one of the load and the fixed supporting structure, said rail and slide being formed as extrusions with the direction of extrusion being parallel to the longitudinal axes of said rail and slide, said rail having a body portion that is generally rectangular in cross-sectional configuration as defined by a first wall, a pair of spaced apart generally parallel side walls oriented generally perpendicular to and integrally joined to said first wall, and a second wall integrally joined to said side walls and oriented generally parallel to said first wall, said second wall having said slot opening therein, said rail first wall having a laterally extending mounting web flange portion protruding therefrom along one longitudinal side edge of, and as an integral extension of said rail first wall and being oriented generally co-planar therewith exteriorly of said rail so as to be clear of obstruction by said rail body portion, said slide having a first wall integrally joined to said slide web and being oriented generally perpendicular thereto and a pair of spaced apart generally parallel side walls integrally joined one to each side edge of said slide first wall and flanking the lead screw therebetween, and said slide web having a planar mounting platform oriented generally perpendicular to said web and integrally joined to an edge portion thereof disposed exteriorly of said rail and oriented in juxtaposed relation thereto.

56. The subcombination set forth in claim 55 wherein said slide web mounting platform has a coplanar lateral extension mounting flange portion generally juxtaposed to said rail and protruding laterally from one side edge of said slide mounting platform as an integral extension thereof so as to be clear of obstruction by said rail body portion.

57. The subcombination set forth in claim 56 wherein said slide side walls have curved sections defining laterally opposed interiorly facing concave surfaces formed one in each slide side wall and oriented concentric with and nesting therebetween said lead screw.

58. The subcombination set forth in claim 57 wherein said rail side walls have curved sections defining laterally opposed interiorly facing concave surfaces formed one in each rail side wall and oriented concentric with aid nesting therebetween said curved sections of said slide side walls.

59. The subcombination set for the in claim 58 wherein said slide has at least two glides fixedly carried on the exterior thereof, one adjacent each of longitudinally opposite ends thereof, each said glide having a cross-sectional configuration generally complemental to that of the exterior surfaces of said slide and the interior surfaces of said rail and generally forming a slide bearing for sliding engagement with said rail interior surfaces.

60. The subcombination set forth in claim 59 wherein each said glide is molded or extruded from plastic material having a low coefficient of friction and a free-state configuration adapted to be flex stressed when in assembly on said slide and being shaped to provide slide bearing zones adjacent each of four zones of said slide wall generally juxtaposed individually to four corners of said rail body rectangular cross section.

61. The subcombination set forth in claim 60 wherein each said glide is made of self-lubricating plastic material, and said rail and slide are extruded from metallic aluminum material.

62. The subcombination set forth in claim 61 wherein said slide side walls have laterally opposite nut openings therein, and said lead screw nut protrudes outwardly through and is non-rotatably engaged in said nut opening to provide the nut-to-slide driving engagement for imparting relative motion to said slide in response to threaded relative travel of said lead screw nut along said lead screw.

63. The subcombination set forth in claim 62 wherein said each longitudinal side edge of said rail first wall has a re-entrant cured channel portion extending outwardly from the respectively adjacent rail side wall to provide a smooth rounded contour to each said rail first wall outer longitudinal edges and to define internally of each of said channel portion a mounting screw opening at each of the longitudinally opposite ends of said rail.

64. The subcombination set forth in claim 63 wherein the exterior surface of each of said rail side walls has a re-entrantly carved and laterally protruding rib disposed closely adjacent said rail second wall and defining a channel forming internally thereof a mounting screw opening at each of the longitudinally opposite ends of said rail.

65. The subcombination set forth in claim 64 wherein said each slide side wall terminates in a free edge remote from said slide web wall and extends longitudinally of said slide, said slide side wall free edge being juxtaposed in assembly to said rail second wall and having a slot therein opening toward said rail second wall, and wherein said glide has a pair of ribs protruding one into each of said free edge slots.

66. The subcombination set forth in claim 65 wherein said glide has a laterally folded portion protruding interiorly of said slide in the space between said slide side wall free edges and serving as a folded spring having the capability to compensate for dimensional variations in the slide extrusion profile and in the molded plastic glide.

67. An electromechanical dual linear drive system for moving a load along a linear travel path comprising:
   (a) a pair of first and second rails each co uprising an elongate hollow rail with the longitudinal axes of said rails supported in parallelism,
   (b) a pair of first and second slides each comprising an elongate hollow slide non-rotatably mounted respectively within the interior of said first and second rails with its longitudinal axis oriented parallel to that of said respective rail and slidably relatively movable therealong in a linear travel path, one of pairs of said slides and rails being adapted to be coupled to the load for moving the same in respond to relative movement of said slides and rails in their respective travel paths, and the other one of said pairs of said slides and rails adapted for mounting to a fixed supporting structure,
   (c) first and second lead screws respectively rotatably mounted within said first and second slides and rails and extending axially thereof for the length of the respective slide travel path along said respective rail,
   (d) first and second traveling nuts respectively drivingly and non-rotatably engaged with said first and second slides and threadably received respectively on said first and second lead screws for relatively moving said respective slides with respect to their associated rails in response to rotation of said respective lead screw,
   (e) first and second gear reduction drive units respectively fixedly mounted on said first and second rails and each having rotary output member driving coupled to one end of said respective lead screw for rotating the same while holding the same against axial motion, and
   (f) an electric motor having an output shaft rotationally drivingly coupled to a rotary input member of each said gear reduction drive unit for producing rotation of said lead screws via said gear drive units in response to motor rotation, and wherein the cross-sectional configurations of each said rail and that of each said slide are non-circular and complementary for restraining rotation of said slide about said axis relative to said rail, each said rail having a slot opening extending axially therealong for at least the distance of the respective slide travel path, and wherein each said slide has a we member protruding from the interior to the exterior of said respective rail through said slot, sad web member being arranged and constructed for coupling said respective one of slide to the load and the fixed supporting structure, wherein each said rail and slide are formed as extrusions with the direction of extrusion being parallel to the longitudinal axes of said rail and slide, each said rail having a body portion that is generally rectangular in cross-sectional configuration as defined by a first wall, a pair of spaced apart generally parallel side walls oriented generally perpendicular to and integrally joined to said first wall, and a second wall integrally joined to said side walls and oriented generally parallel to said first wall, said second wall having said slot opening therein, each said rail first wall having a laterally extending mounting flange portion protruding therefrom along one longitudinal side edge of, and as an integral extension of, said respective rail first wall and being oriented generally co-planar therewith so as to be clear of obstruction by said respective rail body portion, each said slide having a first wall integrally joined to said respective slide web and being oriented generally perpendicular thereto and a pair of spaced apart generally parallel side walls integrally joined one to each side edge of said respective slide first wall and flanking respective the lead screw therebetween, and each said slide web having a planar mounting platform oriented generally perpendicular to said web and integrally joined to an edge portion thereof disposed exteriorly of said respective rail and orient d in juxtaposed relation thereto.

68. The dual drive system set forth in claim 67 wherein each said slide web mounting platform has a coplanar lateral extension mounting flange portion generally juxtaposed to said respective rail and protruding laterally from one side edge of said respective slide mounting platform as an integral extension thereof so as to be clear of obstruction by said rail body portion.

69. The dual drive system set forth in claim 68 wherein said slide side walls of each said slides have curved sections defining laterally opposed interiorly facing concave surfaces formed one in each respective slide side wall and oriented concentric with and nesting therebetween said respective lead screw.

70. The dual drive system set forth in claim 69 wherein said rail side walls of each said rail have curved sections defining literally opposed interiorly facing concave surfaces formed one in each rail side wall and oriented concentric with and nesting therebetween said curved sections of said respective slide side walls.

71. The dual drive system set forth in claim 70 wherein each said slide has at least two glides fixedly carried on the exterior hereof, one adjacent each of longitudinally opposite ends thereof, each said glide encircling all but said web member of said slide and having a cross sectional configuration generally complemental to that of the exterior surfaces of said slide and the interior surfaces of said respective rail and generally forming a slide bearing for sliding engagement with said respective rail interior surfaces.

72. The dual drive system set forth in claim 71 wherein each said glide is molded or extruded from plastic material having a low coefficient of friction and a free-state configuration adapted to be flex stressed when in assembly on said slide and being shaped to provide a plurality of slide bearing zones spaced around the exterior periphery of said glides.

73. The dual drive system set forth in claim 72 wherein each said glide is made of self-lubricating plastic material, and each slide rail and slide is extruded from metallic aluminum material.

74. The dual drive system set forth in claim 73 wherein said slide side walls of each said slide have laterally opposite nut openings therein, and each said lead screw nut protrudes outwardly through and is non-rotatably engaged in said respective nut opening to provide the respective nut-to-slide driving engagement for imparting relative motion to said respective slide in response to threaded relative travel of said respective lead screw nut along said respective lead screw.

75. The dual drive system set forth in claim 67 wherein said each longitudinal side edge of each said rail first wall has a re-entrant curved channel portion extending outwardly from the respectively adjacent rail side wall to provide a smooth rounded contour to each said rail first wall outer longitudinal edges and to define internally of each of said channel portion a mounting screw opening at each of the longitudinally opposite ends of each said rail.

76. The dual drive system set forth in claim 75 wherein the exterior surface of each of said rail side walls of each said rail has a re-entrantly curved and laterally protruding rib disposed closely adjacent said respective rail second wall and defining a channel forming internally thereof a mounting screw opening at each of the longitudinally opposite ends of each said rail.

77. The dual drive system set forth in claim 76 wherein said each slide side wall of each said slide terminates in a free edge remote from said respective slide web wall and extends longitudinally of said respective slide, each said slide side wall free edge being juxtaposed in assembly to said respective rail second wall and having a slot therein opening toward said respective rail second wall, and wherein each said glide has a pair of ribs protruding one into each of said free edge slots of said respective slide.

78. The dual drive system set forth in claim 77 wherein each said glide has a laterally folded portion protruding interiorly of said respective slide in the space between said slide side wall free edges of said respective slide side walls and serving as a folded spring to compensate for dimensional variations in the respective slide extrusion profile and/or in the respective molded plastic glide.

\* \* \* \* \*

UNITED STATES PATENT AND TRADEMARK OFFICE
CERTIFICATE OF CORRECTION

PATENT NO.   : 6,499,712 B1
DATED        : December 31, 2002
INVENTOR(S)  : Clark et al.

It is certified that error appears in the above-identified patent and that said Letters Patent is hereby corrected as shown below:

Column 1,
Line 5, replace "be nefit" with -- benefit --.

Column 4,
Line 24, replace "side" with -- slide --.

Column 5,
Line 33, replace "aE" with -- at --.

Column 6,
Line 42, replace "s hallow" with -- shallow --.

Column 8,
Line 34, replace "1" with -- 13 --.

Column 9,
Line 10, replace "head" with -- end --.

Column 10,
Line 15, replace "13" with -- 130 --.
Line 46, replace "141" with -- 140 --.
Line 60, replace "will" with -- wall --.
Line 66, replace "vacations" with -- variations --.

Column 11,
Line 36, replace "attach" with -- at each --.

Column 12,
Line 2, replace "mate rial" with -- material --.
Lines 40-41, replace "fur her" with -- further --.

UNITED STATES PATENT AND TRADEMARK OFFICE
CERTIFICATE OF CORRECTION

PATENT NO.    : 6,499,712 B1
DATED         : December 31, 2002
INVENTOR(S)   : Clark et al.

It is certified that error appears in the above-identified patent and that said Letters Patent is hereby corrected as shown below:

Column 13,
Line 57, replace "rigidity" with -- rigidify --.
Line 62, replace "sea" with -- seat --.

Column 14,
Line 21, replace "eat" with -- seat --.

Column 15,
Line 27, replace "sail" with said --.
Line 39, after "parallel side to" insert -- walls --.
Line 50, replace "si" with -- side --.

Column 17,
Line 19, replace "o" with -- of --.
Line 28, replace "sad" with -- said --.

Column 18,
Line 33, replace "hereof" with -- thereof --.

Column 19,
Lines 5 and 16, replace "sad" with -- said --.

Column 22,
Line 47, replace "aid" with -- and --.
Line 49, replace "for" with -- forth --.

Column 23,
Line 9, replace "cured" with -- curved --.
Line 36, replace "co uprising" with -- comprising --.
Line 46, replace "respond" with -- response --.

UNITED STATES PATENT AND TRADEMARK OFFICE
CERTIFICATE OF CORRECTION

PATENT NO.   : 6,499,712 B1
DATED        : December 31, 2002
INVENTOR(S)  : Clark et al.

It is certified that error appears in the above-identified patent and that said Letters Patent is hereby corrected as shown below:

Column 24,
Line 8, replace "we" with -- web --.
Line 10, replace "sad" with -- said --.
Line 39, replace "orient d" with -- oriented --.
Line 55, replace "literally" with -- laterally --.
Line 61, replace "hereof" with -- thereof --.

Column 25,
Line 9, replace "slide" with -- said --.

Signed and Sealed this

Twenty-first Day of October, 2003

JAMES E. ROGAN
*Director of the United States Patent and Trademark Office*